US012791678B2

(12) United States Patent
Pei et al.

(10) Patent No.: US 12,791,678 B2
(45) Date of Patent: Nov. 10, 2026

(54) ROTATING LIDAR MIRROR HAVING DIFFERENT SURFACE WIDTHS

(71) Applicant: Cepton Technologies, Inc., San Jose, CA (US)

(72) Inventors: Jun Pei, Saratoga, CA (US); Si Tan, Santa Clara, CA (US); Liang Zhou, San Jose, CA (US); Mark A. McCord, Los Gatos, CA (US)

(73) Assignee: Cepton Technologies, Inc., San Jose, CA (US)

( * ) Notice: Subject to any disclaimer, the term of this patent is extended or adjusted under 35 U.S.C. 154(b) by 763 days.

(21) Appl. No.: 18/200,457

(22) Filed: May 22, 2023

(65) Prior Publication Data

US 2023/0375675 A1 Nov. 23, 2023

Related U.S. Application Data

(60) Provisional application No. 63/344,361, filed on May 20, 2022.

(51) Int. Cl.

| | |
|---|---|
| ***G01S 7/48*** | (2006.01) |
| ***G01S 7/481*** | (2006.01) |
| ***G02B 5/09*** | (2006.01) |
| ***G02B 7/182*** | (2021.01) |

(52) U.S. Cl.

CPC .......... *G01S 7/4817* (2013.01); *G01S 7/4815* (2013.01); *G01S 7/4816* (2013.01); *G02B 5/09* (2013.01); *G02B 7/1821* (2013.01)

(58) Field of Classification Search

None

See application file for complete search history.

(56) References Cited

U.S. PATENT DOCUMENTS

| | | | | |
|---|---|---|---|---|
| 4,410,269 | A | 10/1983 | Jeffery | |
| 4,967,076 | A | 10/1990 | Schuhmacher et al. | |
| 10,451,740 | B2 | 10/2019 | Pei et al. | |
| 10,571,567 | B2 | 2/2020 | Campbell et al. | |
| 10,578,720 | B2 | 3/2020 | Hughes et al. | |
| 10,690,754 | B2 | 6/2020 | Pei et al. | |
| 10,921,431 | B2 | 2/2021 | Pei et al. | |
| 10,921,432 | B2 | 2/2021 | Barbello et al. | |
| 10,935,637 | B2 | 3/2021 | Cullumber et al. | |
| 11,150,348 | B2 | 10/2021 | Allen et al. | |
| 11,822,020 | B2 | 11/2023 | Pei et al. | |
| 12,242,001 | B2 | 3/2025 | McCord | |
| 12,313,784 | B2 | 5/2025 | Liao et al. | |
| 2007/0181810 | A1* | 8/2007 | Tan ....................... | G01S 7/4811 250/341.1 |

(Continued)

OTHER PUBLICATIONS

International Search Report and Written Opinion of the International Searching Authority dated Oct. 3, 2023 in related International Application No. PCT/US2023/023064 (15 pages).

(Continued)

*Primary Examiner* — Hovhannes Baghdasaryan

(74) *Attorney, Agent, or Firm* — Kilpatrick Townsend & Stockton LLP

(57) ABSTRACT

A rotating mirror for LiDAR has a first side and a second side of unequal width. As the rotating mirror spins, light from an illumination source scans different widths of a field of view. By scanning different widths of a field of view, higher resolution can be arranged in a region of interest.

17 Claims, 18 Drawing Sheets

(56) References Cited

U.S. PATENT DOCUMENTS

| | | | | |
|---|---|---|---|---|
| 2018/0180720 | A1 | 6/2018 | Pei et al. | |
| 2018/0284237 | A1* | 10/2018 | Campbell | G01S 17/931 |
| 2018/0284286 | A1 | 10/2018 | Eichenholz et al. | |
| 2018/0329037 | A1 | 11/2018 | Bozchalooi et al. | |
| 2019/0025412 | A1 | 1/2019 | O'Keeffe | |
| 2019/0310351 | A1 | 10/2019 | Hughes et al. | |
| 2020/0200874 | A1 | 6/2020 | Donovan | |
| 2020/0326425 | A1 | 10/2020 | Donovan et al. | |
| 2021/0063542 | A1 | 3/2021 | Zheng et al. | |
| 2022/0043159 | A1* | 2/2022 | Angus | G01S 17/931 |
| 2022/0091236 | A1 | 3/2022 | McCord | |
| 2023/0375674 | A1 | 11/2023 | Pei et al. | |

OTHER PUBLICATIONS

International Preliminary Report on Patentability mailed Dec. 5, 2024 in related International Application No. PCT/US2023/023064; eleven pages.

Invitation To Pay Additional Fees And, Where Applicable, Protest Fee dated Jul. 31, 2023 in related International Application No. PCT/US23/23064 (two pages).

U.S. Appl. No. 18/200,451, Non-Final Office Action, Mailed On May 1, 2026, 11 pages.

* cited by examiner

ROTATING LIDAR MIRROR HAVING DIFFERENT SURFACE WIDTHS

CROSS-REFERENCES TO RELATED APPLICATIONS

This application claims the benefit of U.S. Provisional Patent Application No. 63/344,361, filed on May 20, 2022, which is incorporated by reference for all purposes.

The following two U.S. patent applications (including this one) are being filed concurrently, and the entire disclosure of the other application is incorporated by reference into this application for all purposes:

Application Ser. No. 18,200,451, filed May 22, 2023, entitled "MULTI-SOURCE LIDAR"; and Application Ser. No. 18,200,457, filed May 22, 2023, entitled "ROTATING LIDAR MIRROR HAVING DIFFERENT SURFACE WIDTHS".

BACKGROUND

Three-dimensional (3D) sensors can be applied in various applications, including in autonomous or semi-autonomous vehicles, drones, robotics, security applications, and the like. LiDAR sensors are a type of 3D sensor that can achieve high angular resolutions appropriate for such applications. A LiDAR sensor can include one or more laser sources for emitting laser pulses and one or more detectors for detecting reflected laser pulses. A LiDAR sensor can measure the time it takes for each laser pulse to travel from the LiDAR sensor to an object within the sensor's field of view, then reflect off the object and return to the LiDAR sensor. The LiDAR sensor can calculate a distance how far away the object is from the LiDAR sensor based on the time of flight of the laser pulse. Some LiDAR sensors can calculate distance based a phase shift of light. By sending out laser pulses in different directions, the LiDAR sensor can build up a three-dimensional (3D) point cloud of one or more objects in an environment.

SUMMARY

In certain configurations, an LiDAR system using multiple illumination sources and a rotating mirror comprises: a first illumination source comprising a first plurality of lasers; a second illumination source comprising a second plurality of lasers; a mirror; a detector; and/or one or more memory devices. The mirror is arranged to rotate. The mirror is arranged to reflect light emitted from the first illumination source into an environment. The mirror is arranged to reflect light emitted from the second illumination source into the environment. The detector is arranged to receive light emitted from the first illumination source, after light emitted from the first illumination source is reflected by the mirror into the environment. The one or more memory devices comprise instructions that, when executed by one or more processors, calculates a distance to an object in the environment based on the detector receiving the light emitted from the first illumination source. In some configurations, the mirror is arranged to direct light from the first illumination source into a first field of view; the mirror is arranged to direct light from the second illumination source into a second field of view; the second field of view at least partially overlaps the first field of view; the second field of view overlaps at least ⅛ or ¼ of the first field of view and does not overlap more than ⅞ or ¾ of the first field of view; the mirror comprises a first surface and a second surface; the second illumination source is arranged opposite the first illumination source so that the first illumination source illuminates the first surface of the mirror while the second illumination source illuminates the second surface of the mirror; the mirror comprises a first surface and a second surface; the second illumination source is arranged opposite the first illumination source so that the first illumination source illuminates the first surface of the mirror while the second illumination source illuminates the second surface of the mirror; the mirror comprises a first surface and a second surface; the second illumination source is arranged to illuminate the first surface of the mirror while the first illumination source illuminates the first surface of the mirror; the detector is a first detector; the distance is a first distance; the object is a first object; the system comprises a second detector; the second detector is arranged to receive light emitted by the second illumination source, after light from the second illumination source is reflected by the mirror into the environment; the one or more memory devices comprises instructions that, when executed by the one or more processors, performs a step for calculating a second distance to a second object in the environment based on the second detector receiving the light emitted by the second illumination source; the mirror is arranged to rotate about a vertical axis to reflect light from the first illumination source horizontally into a field of view; a side of the mirror is arranged to rotate vertically to reflect light from the first illumination source vertically into the field of view; the system comprises a platform; the first illumination source is mounted to the platform (e.g., fixedly coupled with); the platform is coupled with a fixed base using flexures; the first illumination source comprises a first plurality of laser diodes arranged in a first region and a second plurality of laser diodes arranged in a second region; the first plurality of laser diodes are arranged in the first region in a higher density than the second plurality of laser diodes are arranged in the second region; the system comprises a beam splitter between the first illumination source and the mirror; the system comprises a first lens and a second lens; the first lens is characterized by a first focal length; the second lens is characterized by a second focal length; the first lens is positioned a first distance from the mirror; the first distance is equal to the first focal length; the second lens is positioned a second distance from the first lens; and/or the second distance is equal to a sum of the first focal length and the second focal length.

In certain configurations, a method for LiDAR using multiple illumination sources comprises emitting light from a first illumination source, wherein the first illumination source comprises a first plurality of lasers; emitting light from a second illumination source, wherein the second illumination source comprises a second plurality of lasers; rotating a mirror; reflecting, using the mirror, light from the first illumination source into an environment; reflecting, using the mirror, light from the second illumination source into the environment; and/or detecting, using a detector, light emitted from the first illumination source, after light emitted from the first illumination source is reflected into the environment. In some configurations, the method comprises directing light from the first illumination source into a first field of view, and directing light from the second illumination source into a second field of view, wherein the second field of view at least partially overlaps the first field of view; the mirror comprises a first surface and a second surface; the second illumination source is arranged opposite the first illumination source so that the first illumination source illuminates the first surface of the mirror while the second illumination source illuminates the second surface of the mirror; the first illumination source is mounted to a platform; the platform is coupled with a fixed base using flexures; the method comprises translating the platform with respect to the fixed base while reflecting light from the first illumination source by the mirror; and/or the method comprises reflecting light from the first illumination source, using a beam splitter, before reflecting light from the first illumination source with the mirror.

In certain configurations, system for LiDAR using a rotating mirror with reflective surfaces of different widths comprises an illumination source and a mirror. The mirror the mirror is arranged to rotate and comprises a first side and second side. The first side has a first width. The second side has a second width. The second width is not equal to the first width. The first side and the second side of the mirror are arranged to reflect light from the illumination source into an environment as the mirror rotates. In some arrangements, the system comprises: a detector arranged to receive light emitted by the illumination source, after light from the illumination source is reflected by the mirror into the environment, and one or more memory devices comprise instructions that, when executed by one or more processors, performs a step for calculating a distance to an object in the environment based on the detector receiving the light emitted by the illumination source, and the mirror rotates about a vertical axis to reflect light from the illumination source into a horizontal field of view; the first width is greater than the second width and equal to or less than four times the second width; the mirror comprises three sides; the first side and the second side have a reflectance, at a wavelength of the illumination source, equal to or greater than 90%; the illumination source is a laser array comprising a plurality of lasers; the mirror rotates about a vertical axis to reflect light from the illumination source horizontally into a field of view; the first side of the mirror rotates vertically to reflect light from the illumination source vertically into the field of view; the mirror rotates about a vertical axis to reflect light from the illumination source in a horizontal field of view; the illumination source is arranged to translate vertically to scan in a vertical dimension; the illumination source comprises a plurality of lasers arranged in a first row and a second row; the illumination source is arranged to translate vertically to scan in a vertical dimension; a distance of vertical movement is equal to a distance between a center of the first row and a center of the second row, plus or minus ten percent of the distance; the illumination source comprises a first plurality of laser diodes arranged in a first region and a second plurality of laser diodes arranged in a second region, and the first plurality of laser diodes are arranged in the first region in a higher density than the second plurality of laser diodes are arranged in the second region; the system comprises a first lens and a second lens; the first lens is characterized by a first focal length; the second lens is characterized by a second focal length; the first lens is positioned a first distance from the mirror; the first distance is equal to the first focal length; the second lens is positioned a second distance from the first lens; the second distance is equal to a sum of the first focal length and the second focal length; the system comprises a lens; light from the illumination source passes through the lens to the mirror; light passes from the mirror through the lens to a detector; illumination source is a first illumination source; the system comprises a second illumination source; the mirror comprises a third side; the second illumination source is arranged opposite the first illumination source so that the first illumination source illuminates the first side of the mirror while the second illumination source illuminates the third side of the mirror; and/or the system comprises a beam splitter between the illumination source and the mirror.

In certain configurations, a method for using a LiDAR having a rotating mirror with different widths comprises emitting light from an illumination source; rotating a mirror; reflecting, using the mirror, light from the illumination source into an environment, while rotating the mirror; detecting, using a detector, light emitted by the illumination source, after light from the illumination source is reflected by the mirror into the environment; and/or calculating a distance to an object in the environment based on the detector detecting the light emitted by the illumination source. The mirror comprises a first side and second side. The first side has a first width. The second side has a second width. The second width is not equal to the first width. In some arrangements, the first width is greater than the second width and equal to or less than four times the second width; and/or the method comprises rotating the mirror about a vertical axis to reflect light from the illumination source in a horizontal field of view, translating the illumination source vertically to vertically displace light from the illumination source in a vertical field of view, passing light from the illumination source through a lens to the mirror, and/or passing light from the mirror through the lens to the detector.

In certain configurations, a system for LiDAR using a rotating mirror and vertical scanning comprises a platform; an illumination source comprising a plurality of lasers mounted on the platform; a flexure coupling the platform with a fixed base; a mirror, wherein the mirror is arranged to rotate and the mirror is arranged to reflect light from the plurality of lasers into an environment as the mirror rotates; a detector comprising one or more sensors arranged to receive light emitted by the illumination source, after light from the illumination source is reflected by the mirror into the environment; and/or one or more memory devices comprises instructions that, when executed by one or more processors, performs a step for calculating a distance to an object in the environment based on the detector receiving the light emitted by the illumination source. In some arrangements, the system comprises a lens between the illumination source and the mirror; the platform is arranged to translate vertically as the mirror rotates horizontally about a vertical axis; the plurality of lasers are mounted on the platform with non-uniform spacing between lasers; the illumination source is a first illumination source; the mirror comprises a first surface and a second surface; the system comprises a second illumination source; the second illumination source is arranged opposite the first illumination source so that the first illumination source illuminates the first surface of the mirror while the second illumination source illuminates the second surface of the mirror; the system comprises a beam splitter between the illumination source and the mirror; the system comprises a first lens and a second lens; the first lens is characterized by a first focal length; the second lens is characterized by a second focal length; the first lens is positioned a first distance from the mirror; the first distance is equal to the first focal length; the second lens is positioned a second distance from the first lens; and/or the second distance is equal to a sum of the first focal length and the second focal length.

In certain configurations, a for using a translating platform and a rotating mirror in LiDAR comprises translating a platform relative to a fixed base, wherein a plurality of lasers are mounted on the platform, a flexure couples the platform to the fixed base, and the plurality of lasers are part of an illumination source; emitting light from the plurality of lasers, while translating the platform; reflecting, using the rotating mirror, light emitted from the illumination source into an environment; detecting light from the illumination source, using a detector, after reflecting light emitted from the illumination source into the environment; and/or calculating a distance to an object in the environment based on detecting the light from the illumination source. In some arrangements, the platform is translated in a vertical dimension, and the rotating mirror rotates horizontally about a vertical axis.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

Figure 1:
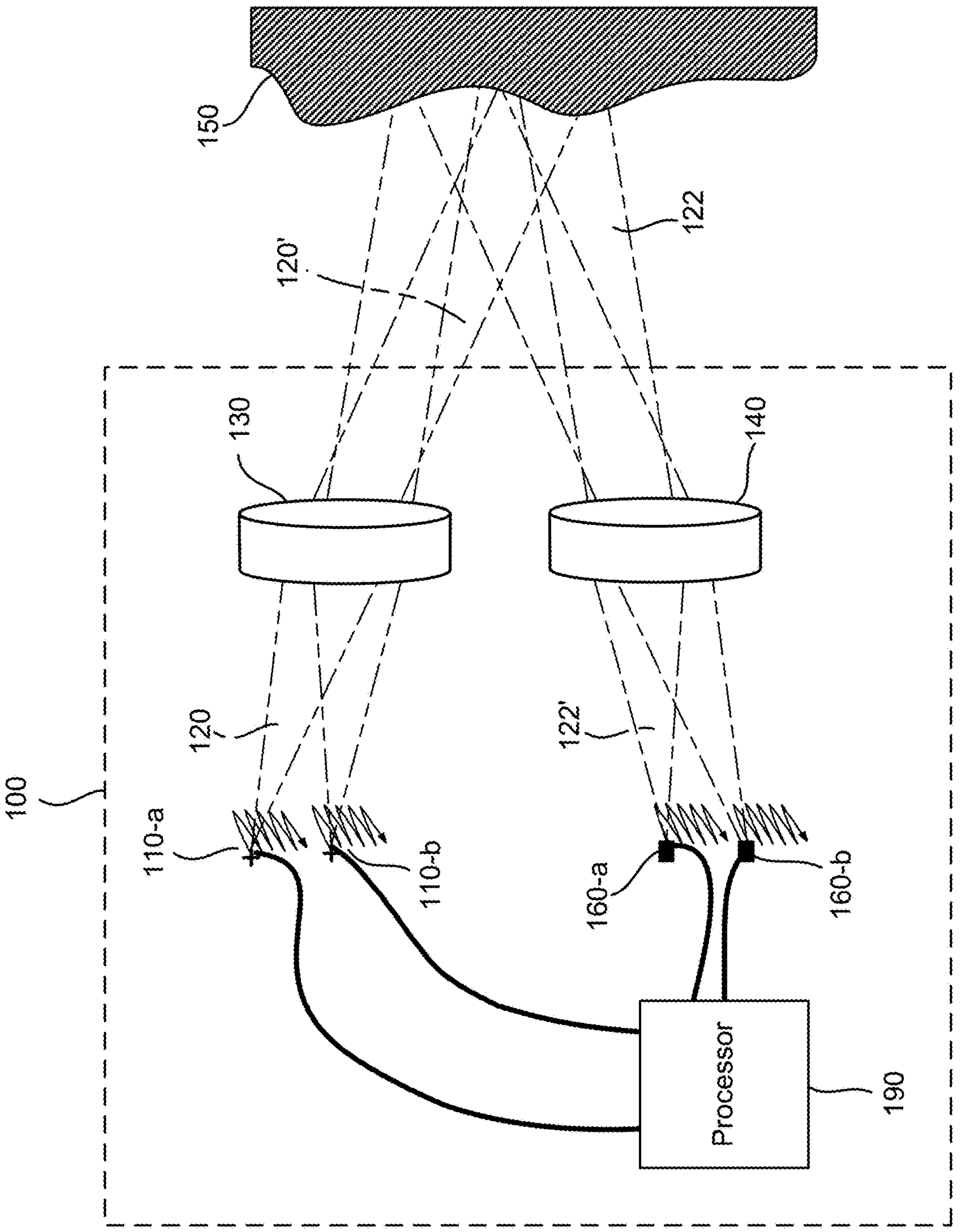
FIG. 1 illustrates an embodiment of a LiDAR sensor for three-dimensional imaging.

FIG. 1 illustrates an embodiment of a LiDAR sensor 100 for three-dimensional imaging. The LiDAR sensor 100 includes an emission lens 130 and a receiving lens 140. The LiDAR sensor 100 includes a light source 110-*a* disposed substantially in a back focal plane of the emission lens 130. The light source 110-*a* is operative to emit a light pulse 120 from a respective emission location in the back focal plane of the emission lens 130. The emission lens 130 is configured to collimate and direct the light pulse 120 toward an object 150 located in front of the LiDAR sensor 100. For a given emission location of the light source 110-*a*, the collimated light pulse 120' is directed at a corresponding angle toward the object 150.

A portion 122 of the collimated light pulse 120' is reflected off of the object 150 toward the receiving lens 140. The receiving lens 140 is configured to focus the portion 122' of the light pulse reflected off of the object 150 onto a corresponding detection location in the focal plane of the receiving lens 140. The LiDAR sensor 100 further includes a detector 160-*a* disposed substantially at the focal plane of the receiving lens 140. The detector 160-*a* is configured to receive and detect the portion 122' of the light pulse 120 reflected off of the object at the corresponding detection location. The corresponding detection location of the detector 160-*a* is optically conjugate with the respective emission location of the light source 110-*a*.

The light pulse 120 may be of a short duration, for example, 10 ns pulse width. The LiDAR sensor 100 further includes a processor 190 coupled to the light source 110-*a* and the detector 160-*a*. The processor 190 is configured to determine a time of flight (TOF) of the light pulse 120 from emission to detection. Since the light pulse 120 travels at the speed of light, a distance between the LiDAR sensor 100 and the object 150 may be determined based on the determined time of flight.

One way of scanning a laser beam (e.g., light pulse 120') across a FOV is to move the light source 110-*a* laterally relative to the emission lens 130 in the back focal plane of the emission lens 130. For example, the light source 110-*a* may be raster scanned to a plurality of emission locations in the back focal plane of the emission lens 130 as illustrated in FIG. 1. The light source 110-*a* may emit a plurality of light pulses at the plurality of emission locations. Each light pulse emitted at a respective emission location is collimated by the emission lens 130 and directed at a respective angle toward the object 150, and impinges at a corresponding point on the surface of the object 150. Thus, as the light source 110-*a* is raster scanned within a certain area in the back focal plane of the emission lens 130, a corresponding object area on the object 150 is scanned. The detector 160-*a* may be raster scanned to be positioned at a plurality of corresponding detection locations in the focal plane of the receiving lens 140, as illustrated in FIG. 1. The scanning of the detector 160-*a* is typically performed synchronously with the scanning of the light source 110-*a*, so that the detector 160-*a* and the light source 110-*a* are always optically conjugate with each other at any given time.

By determining the time of flight for each light pulse emitted at a respective emission location, the distance from the LiDAR sensor 100 to each corresponding point on the surface of the object 150 may be determined. In some embodiments, the processor 190 is coupled with a position encoder that detects the position of the light source 110-*a* at each emission location. Based on the emission location, the angle of the collimated light pulse 120' may be determined. The X-Y coordinate of the corresponding point on the surface of the object 150 may be determined based on the angle and the distance to the LiDAR sensor 100. Thus, a three-dimensional image of the object 150 may be constructed based on the measured distances from the LiDAR sensor 100 to various points on the surface of the object 150. In some embodiments, the three-dimensional image may be represented as a point cloud, i.e., a set of X, Y, and Z coordinates of the points on the surface of the object 150.

In some embodiments, the intensity of the return light pulse 122' is measured and used to adjust the power of subsequent light pulses from the same emission point, in order to prevent saturation of the detector, improve eye-safety, or reduce overall power consumption. The power of the light pulse may be varied by varying the duration of the light pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the reflectivity, as determined by the intensity of the detected pulse, may also be used to add another dimension to the image. For example, the image may contain X, Y, and Z coordinates, as well as reflectivity (or brightness).

The angular field of view (AFOV) of the LiDAR sensor 100 may be estimated based on the scanning range of the light source 110-*a* and the focal length of the emission lens 130 as, $$AFOV = 2\tan^{-1}\left(\frac{h}{2f}\right),$$

where h is a scan range of the light source 110-*a* along certain direction, and f is the focal length of the emission lens 130. For a given scan range h, shorter focal lengths would produce wider AFOVs. For a given focal length f, larger scan ranges would produce wider AFOVs. In some embodiments, the LiDAR sensor 100 may include multiple light sources disposed as an array at the back focal plane of the emission lens 130, so that a larger total AFOV may be achieved while keeping the scan range of each individual light source relatively small. Accordingly, the LiDAR sensor 100 may include multiple detectors disposed as an array at the focal plane of the receiving lens 140, each detector being conjugate with a respective light source. For example, the LiDAR sensor 100 may include a second light source 110-*b* and a second detector 160-*b*, as illustrated in FIG. 1. In other embodiments, the LiDAR sensor 100 may include four light sources and four detectors, or eight light sources and eight detectors. In one embodiment, the LiDAR sensor 100 may include eight light sources arranged as a 4×2 array and eight detectors arranged as a 4×2 array, so that the LiDAR sensor 100 may have a wider AFOV in the horizontal direction than its AFOV in the vertical direction. According to various embodiments, the total AFOV of the LiDAR sensor 100 may range from about 5 degrees to about 15 degrees, or from about 15 degrees to about 45 degrees, or from about 45 degrees to about 120 degrees, depending on the focal length of the emission lens, the scan range of each light source, and the number of light sources.

The light source 110-*a* may be configured to emit light pulses in the near infrared wavelength ranges. The energy of each light pulse may be in the order of microjoules, which is normally considered to be eye-safe for repetition rates in the kHz range. For light sources operating in wavelengths greater than about 1500 nm (in the near infrared wavelength range), the energy levels could be higher as the eye does not focus at those wavelengths. The detector 160-*a* may comprise a silicon avalanche photodiode, a photomultiplier, a PIN diode, or other semiconductor sensors.

Additional LiDAR sensors are described in commonly owned U.S. patent application Ser. No. 15/267,558 filed Sep. 15, 2016, Ser. No. 15/971,548 filed on May 4, 2018, Ser. No. 16/504,989 filed on Jul. 8, 2019, Ser. No. 16/775,166 filed on Jan. 28, 2020, Ser. No. 17/032,526 filed on Sep. 25, 2020, Ser. No. 17/133,355 filed on Dec. 23, 2020, Ser. No. 17/205,792 filed on Mar. 18, 2021, and Ser. No. 17/380,872 filed on Jul. 20, 2021, the disclosures of which are incorporated by reference for all purposes.

Figure 2:
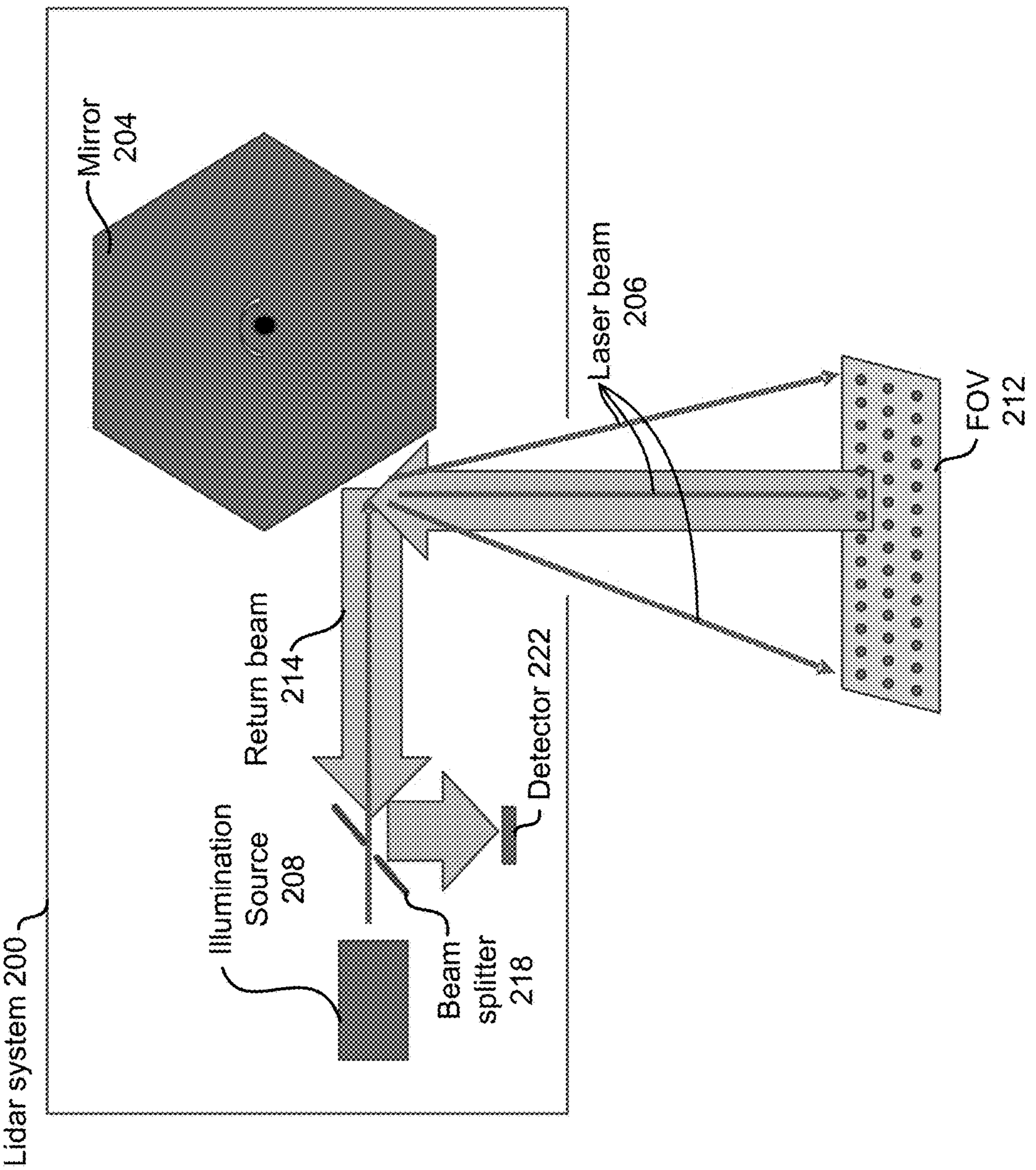
FIG. 2 (Prior Art)
FIG. 2 depicts an embodiment of a LiDAR system with a rotating mirror.

FIG. 2 depicts an embodiment of a LiDAR system 200 comprising a mirror 204 that rotates. The mirror 204 can be used for scanning a laser beam 206 from an illumination source 208 into a field of view (FOV) 212 of the LiDAR system 200. Three rows of points are shown scanned across the FOV 212 with uniform spacing (e.g., a uniform density of points and resolution). The three rows might be achieved, for example, by having three lasers in a vertical direction (out of the page). The mirror 204 is a polygon mirror. Conventional polygon mirrors are made from a number of planar, equally sized mirror segments fabricated onto a spinning rotor, rotating at a uniform rotational velocity. Compared to other types of optical scan devices, such as galvo mirrors, the polygon mirror has low vibration, low power requirement, and linear scan characteristic. A return beam 214 reflects off the mirror 204 and reflects from a beam splitter 218 and toward a detector 222 (e.g., to a photodetector for calculating one or more points for a LiDAR point cloud).

In some LiDAR applications, there is a desire to have higher resolution in a center portion or region of interest (ROI) of the field of view (FOV). Normally, this is not achievable using a polygonal mirror with a uniform rotational velocity and equally sized mirror segments.

Figure 3:
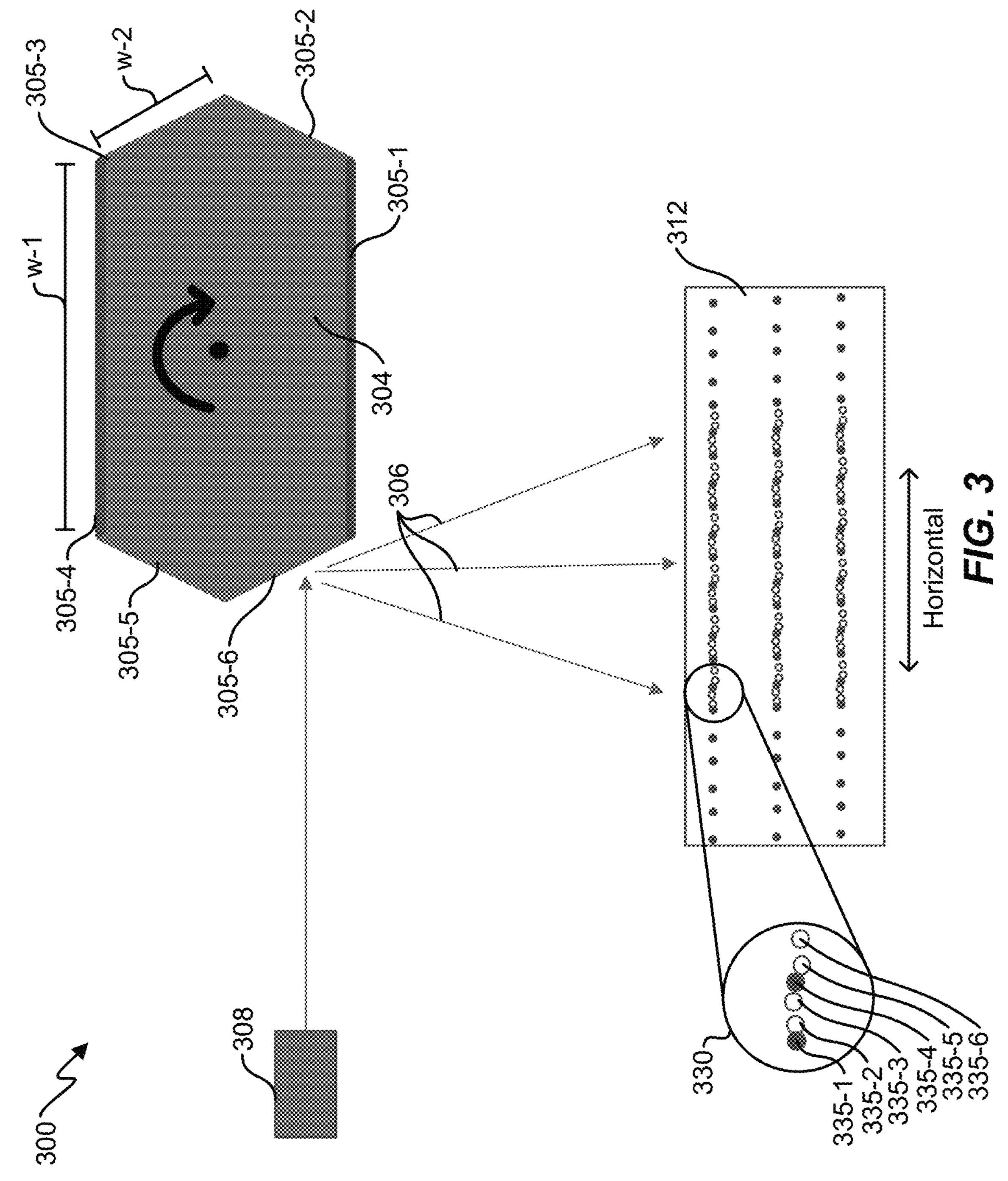
FIG. 3 depicts an embodiment of a LiDAR system with a rotating mirror having reflective surfaces of different widths.

FIG. 3 depicts an embodiment of a LiDAR system 300 comprising a mirror 304 that has sides 305 of different widths. The mirror 304 is a polygon mirror. The sides 305 are reflective surfaces of the mirror 304. The mirror 304 is used for scanning one or more laser beams 306 from an illumination source 308 into a field of view (FOV) 312 of the LiDAR system 300. For example, the sides 305 of the mirror 304 reflect light from the illumination source 308 into the environment, within the FOV 312, as the mirror 304 rotates. In some configurations, the illumination source 308 is a laser array comprising a plurality of lasers (e.g., equal to or between 2 and 64 lasers).

The mirror 304 is arranged, or configured, to rotate (e.g., at a constant rotational velocity). The mirror 304 comprises a first side 305-1, a second side 305-2, a third side 305-3, a fourth side 305-4, a fifth side 305-5, and a sixth side 305-6. The sides 305 are highly reflective (e.g., a reflectance, at a wavelength of the illumination source 308 source, equal to or greater than 80, 90, 95, 97, 98, or 99 percent).

Though shown with six sides 305, the mirror 304 could be more or fewer sides 305 (e.g., 3, 4, 5, 7, or 8 sides). Widths of sides 305 are unequal. The first side 305-1 and the fourth side 305-4 have a first width w-1. The second side 305-2, the third side 305-3, the fifth side 305-5, and the sixth side 305-6 have a second width w-2. The second width w-2 is not equal to the first width w-1 (e.g., the first width w-1 is wider than the second width w-2). The sides 305 have the same height (e.g., in the vertical direction). The mirror 304 rotates about a vertical axis 316 to reflect light from the illumination source 308 horizontally in the FOV 312.

In the FOV 312 are points (e.g., dots) that are filled and unfilled. Filled dots represent a reflection from a side 305 of length w-1. Unfilled dots represent a reflection from a side 305 of length w-2. The unfilled dots scan in only a center of the FOV 312. The filled dots scan a wider area (e.g., assuming constant rotation speed of the mirror 304; in some configurations the mirror 304 can rotate at variable rotation speed).

A detector is arranged to receive light emitted by the illumination source 308, after light from the illumination source 308 is reflected by the mirror 304 into the environment. A distance to an object in the environment is calculated based on the detector receiving the light emitted by the illumination source 308 (e.g., a portion of light emitted by the illumination source 308 is reflected from the object to the mirror 304, and from the mirror 304 to the detector).

In FIG. 3, planar mirror segments (e.g., sides 305) are used to encompass different angular extents. Smaller mirror segments scan a central area of the FOV 312, while wider segments scan, horizontally, the full FOV 312. In combination, this results in a denser point distribution in the central area or region of interest, with correspondingly better resolution in the central area or region of interest.

A firing rate of a laser can be modified to be offset in relation to rotation of the mirror 304 to offset points in the FOV 312 to increase coverage. An enlargement 330 of points 335 that are part of a point cloud in the FOV 312 is shown in FIG. 3. The enlargement 330 shows a set of points 335 including a first point 335-1, a second point 335-2, a third point 335-3, a fourth point 335-4, a fifth point 335-5, and a sixth point 335-6. The first point 335-1 is from a reflection of the first side 305-1. The second point 335-2 is from a reflection of the second side 305-2. The third point 335-3 is from a reflection of the third side 305-3. The fourth point 335-4 is from a reflection of the fourth side 305-4. The fifth point 335-5 is from a reflection of the fifth side 305-5. The sixth point 335-6 is from a reflection of the sixth side 305-6. The set of points 335 in the enlargement 330 is repeated in the center of the FOV 312, based on a firing rate of a laser. A horizontal scanline shown in the FOV 312 is for one full rotation of the mirror 304. The FOV 312 shows three scanlines for scanning of three lasers stacked vertically. In some arrangements, a dithering mirror is used to vertically displace points 335 from one laser.

A pattern of a scanline can be configured to repeat every rotation (360 degrees), or half rotation (180 degrees), of the mirror 304. One frame is considered one full rotation of the mirror 304. In some configurations, a scanline pattern is repeated every N frames, wherein N is an integer. For example, if N=10, and there were 10 frames per second, then a scanline pattern would repeat every second. In some configurations, N is equal to or greater than 1, 2, 3, 5, or 7 and/or equal to or less than 7, 10, 15, 20, 30, or 50.

In FIG. 3, the first width w-1 is about two-and-a-half times the second width w-2. In some arrangements, the first width w-1 is greater than or equal to 1.2, 1.5, 1.75, 2, or 2.5 times the second width w-2 and/or equal to and/or less than 5, 4, or 3 times the second width w-2.

Though there are six sides 305 shown in FIG. 3, the mirror 304 can have a fewer number or greater number than six sides 305. A fewer number of sides could be used for a wider FOV 312. For example, three for 120 degrees, four for 90 degrees, five for 72 degrees, or six for 60 degrees. A larger number of sides could be used for a narrower FOV 312 and/or higher density of points.

The mirror 304 can be non-symmetrical and/or have different arrangement of widths of sides 305. For example, the mirror 304 could have three sides with two long sides and one short side, three sides with three different widths, four sides with three short sides and one long side, or four sides with two short sides and two long sides, depending on the application and desired density distribution.

Figure 4:
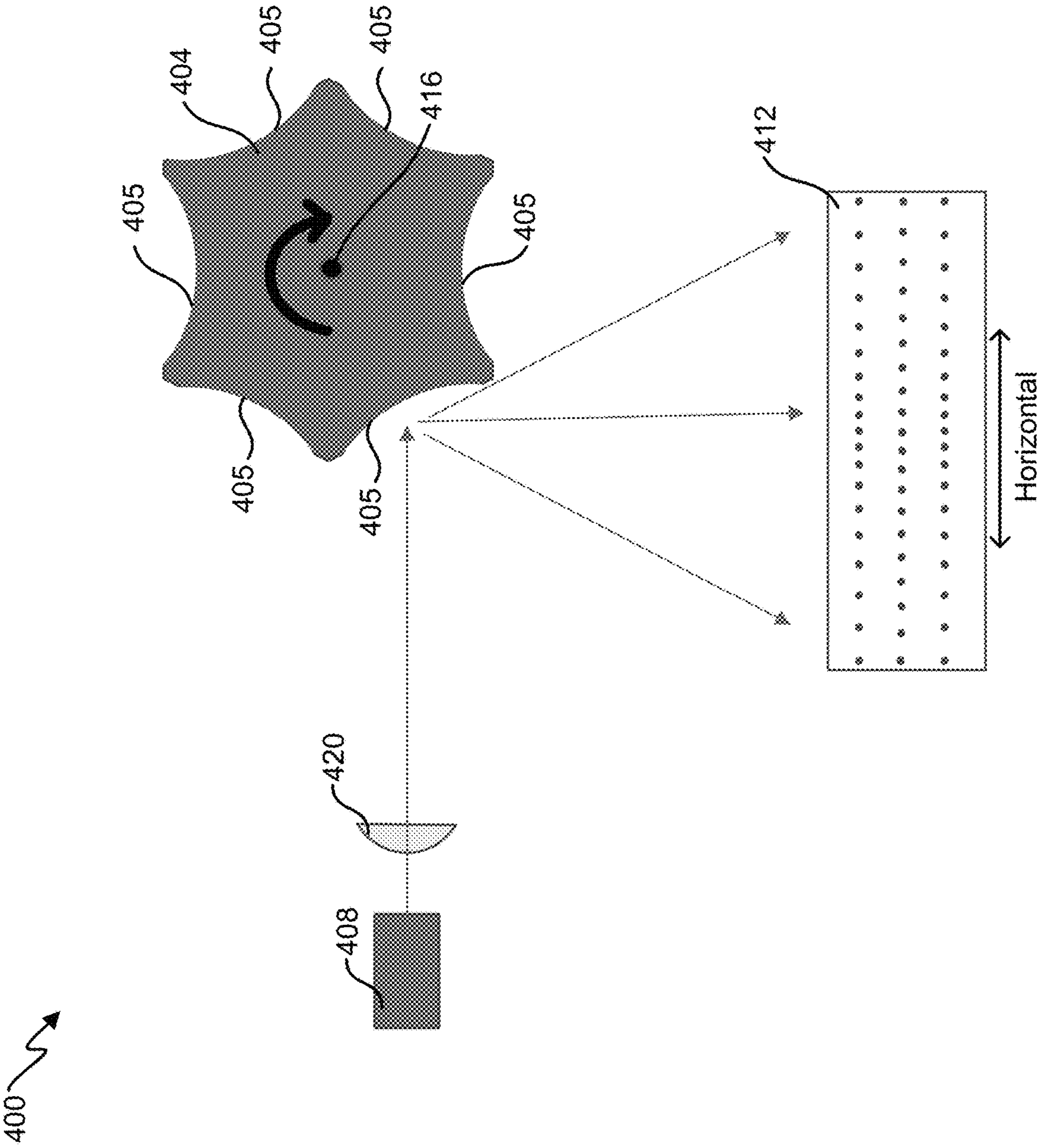
FIG. 4 depicts an embodiment of a LiDAR system with a rotating mirror having non-planar reflective surfaces.

FIG. 4 depicts an embodiment of a LiDAR system 400 with a rotating mirror 404 having non-planar reflective surfaces. The mirror 404 has sides 405 that are curved. As the mirror 404 rotates, light from an illumination source 408 reflects off varying angles of the sides 405 of the mirror 404, resulting in a non-uniform scanning speed in a field of view (FOV) 412. By properly curving the sides 405 (e.g., with a concave shape), scanning will be slower in a center portion of a side 405, resulting in a higher density of LiDAR image points in a center of the FOV 412.

The sides 405 are curved in one dimension, in a direction perpendicular to a rotation axis 416 of the mirror 404 (e.g., curved within a plane of the page of FIG. 4). The rotation axis 416 is parallel to a vertical direction. In some arrangements, the sides 405 are curved in a direction parallel to the rotation axis 416 of the mirror 404 (e.g., curved into and out of the page; in addition to or in lieu of curvature in the direction perpendicular to the rotation axis 416). Curvature parallel to the rotation axis 416 may be used to increase a density of points in a center of the FOV 412 in a vertical direction (e.g., for either a single laser that is scanned in the vertical direction by a second mirror or for multiple laser beams that are spaced apart in the vertical direction). The curvature in the vertical direction may be used to counter an astigmatism effect that could be caused by a side 405 that is curved in only a horizontal direction. In some arrangements, an optic 420 for astigmatic correction (e.g., a cylindrical lens) may be incorporated into a beam path to correct astigmatism from curved sides 405 of the mirror 404. Curvature of a side 405 of the mirror 404 may be non-uniform (e.g., having a non-uniform radius of curvature), possibly with multiple sub-segments, to tailor a point density in each portion of the FOV 412. Curvature may also be adjusted to add a lens or focus effect into the beam path.

Figure 5:
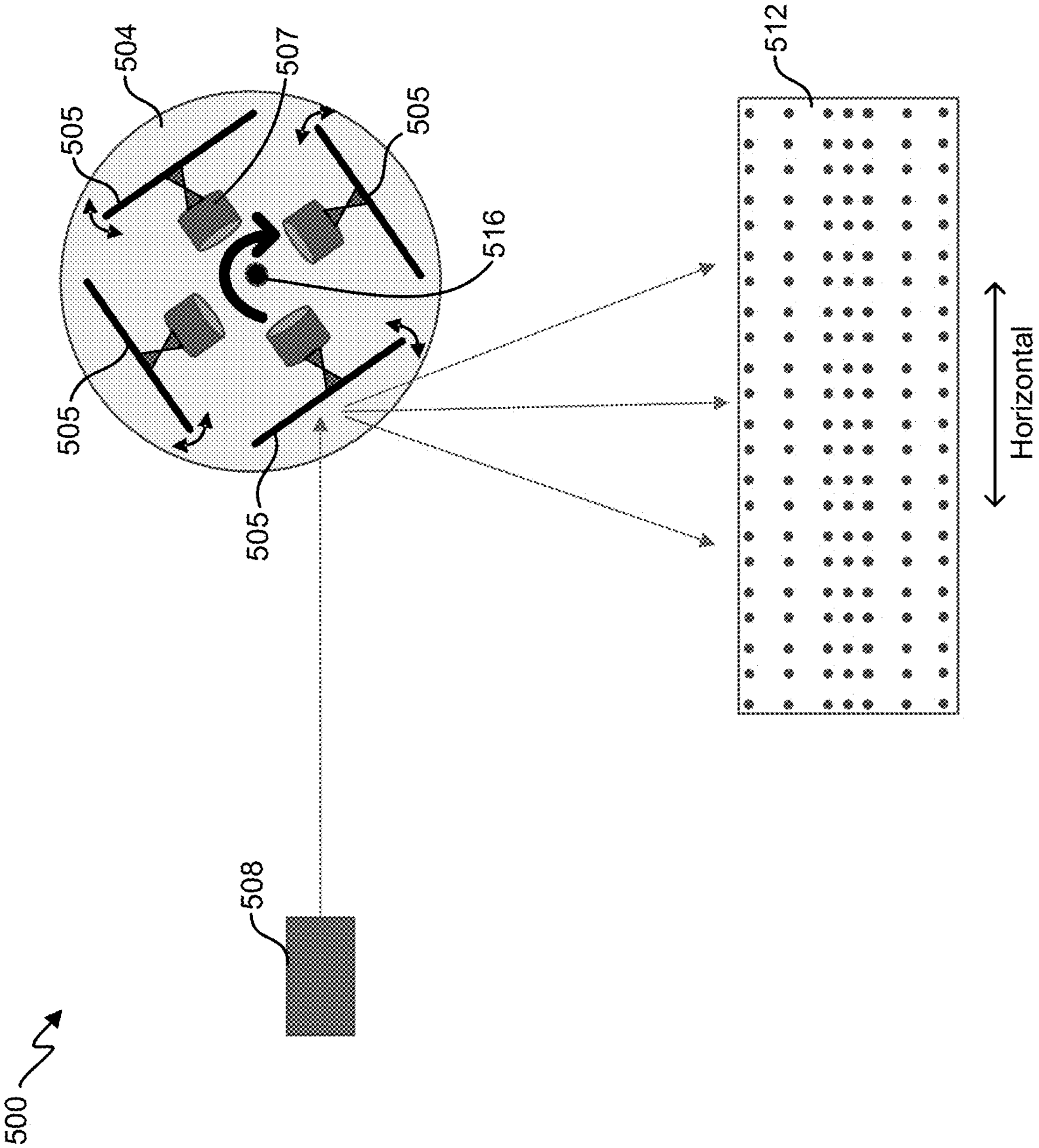
FIG. 5 depicts an embodiment of a LiDAR system with a rotating mirror having rotating reflective surfaces.

FIG. 5 depicts an embodiment of a LiDAR system 500 with a rotating mirror having sides 505 that rotate. Light from an illumination source 508 is reflected by the sides 505 of the mirror 504 into a field of view (FOV) 512. The mirror 504 rotates about a vertical axis 516 to reflect light from the illumination source 508 in a horizontal field of view, and sides 505 of the mirror 504 rotate (e.g., tilt) vertically and/or horizontally to reflect light from the illumination source 508 vertically and/or horizontally into the FOV 512.

In FIG. 5, each side 505 of the mirror 504 is set on an adjustable mount that can be tilted horizontally and/or vertically in real time. The sides 505 may be held by a pivot bearing or by a flexure. A drive mechanism 507 can be an electric motor, stepper motor, voice coil, piezo-electric device, and/or other drive mechanism. In some arrangements, the pitch of each side 505 is set mechanically (e.g., by a mechanism similar to that used to set the pitch of blades on a helicopter). In operation, a side 505 can be tilted as the mirror 504 spins, thus altering a direction of a scanning beam. With proper control logic, a scanning pattern can be arranged to place more points within a given ROI and fewer points outside the ROI, thus giving higher resolution within the ROI.

Figure 6:
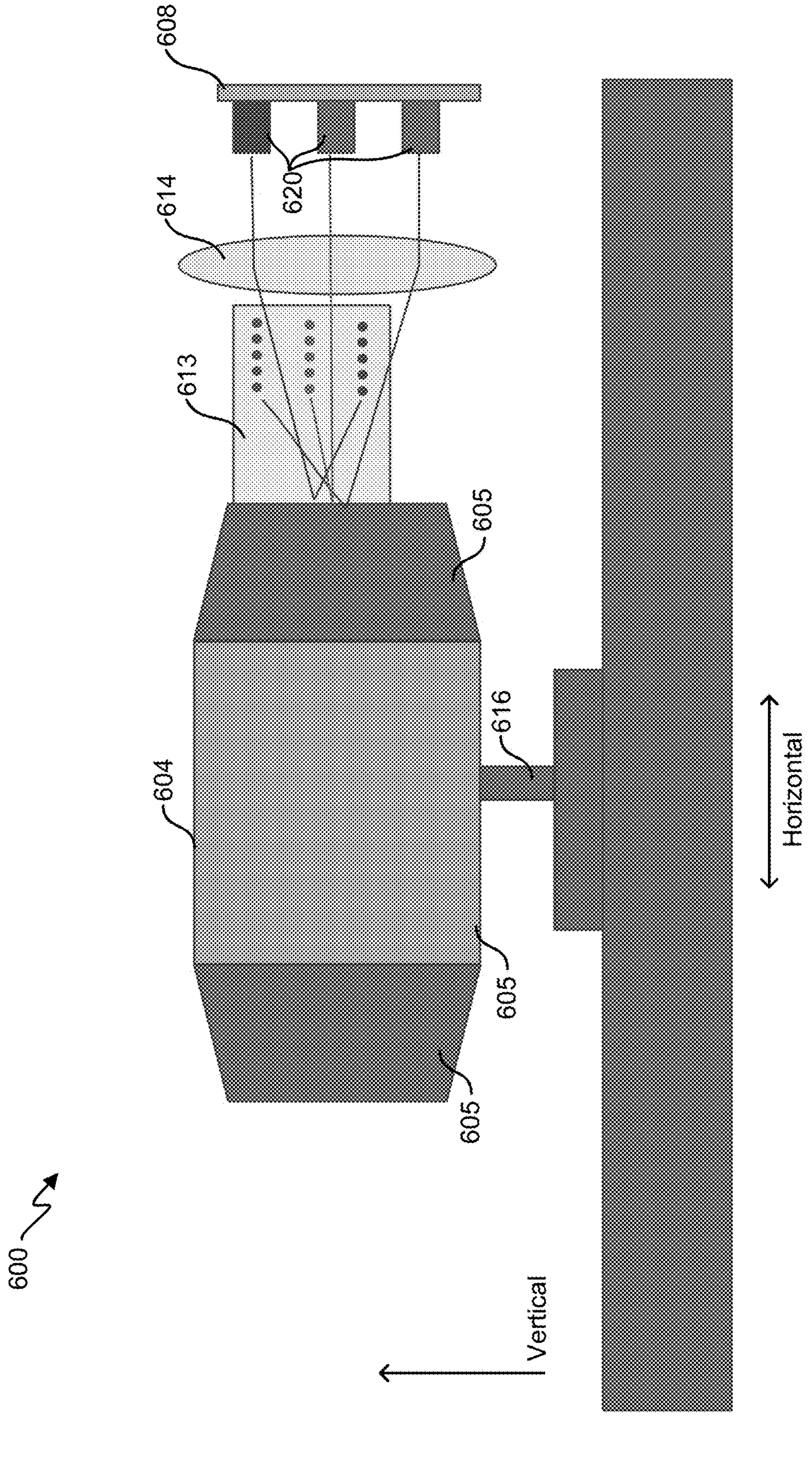
FIG. 6 depicts a side view an embodiment of a LiDAR system with a rotating mirror.

FIG. 6 depicts a side view an embodiment of a LiDAR system 600 with a rotating mirror 604. Light from an illumination source 608 (e.g., after passing through a collimating lens 614) is reflected by the mirror 604 into a far-field pattern 613 as the mirror 604 rotates about a vertical axis 616. The illumination source 608 comprises one or more lasers 620. The lasers 620 shown in FIG. 6 are arranged in a vertical column. The lasers 620 are mechanically scanned in the vertical direction as rotation of the mirror 604 scans in the horizontal direction, thus achieving a 2-dimensional scan profile in the far-field pattern 613.

Figure 7:
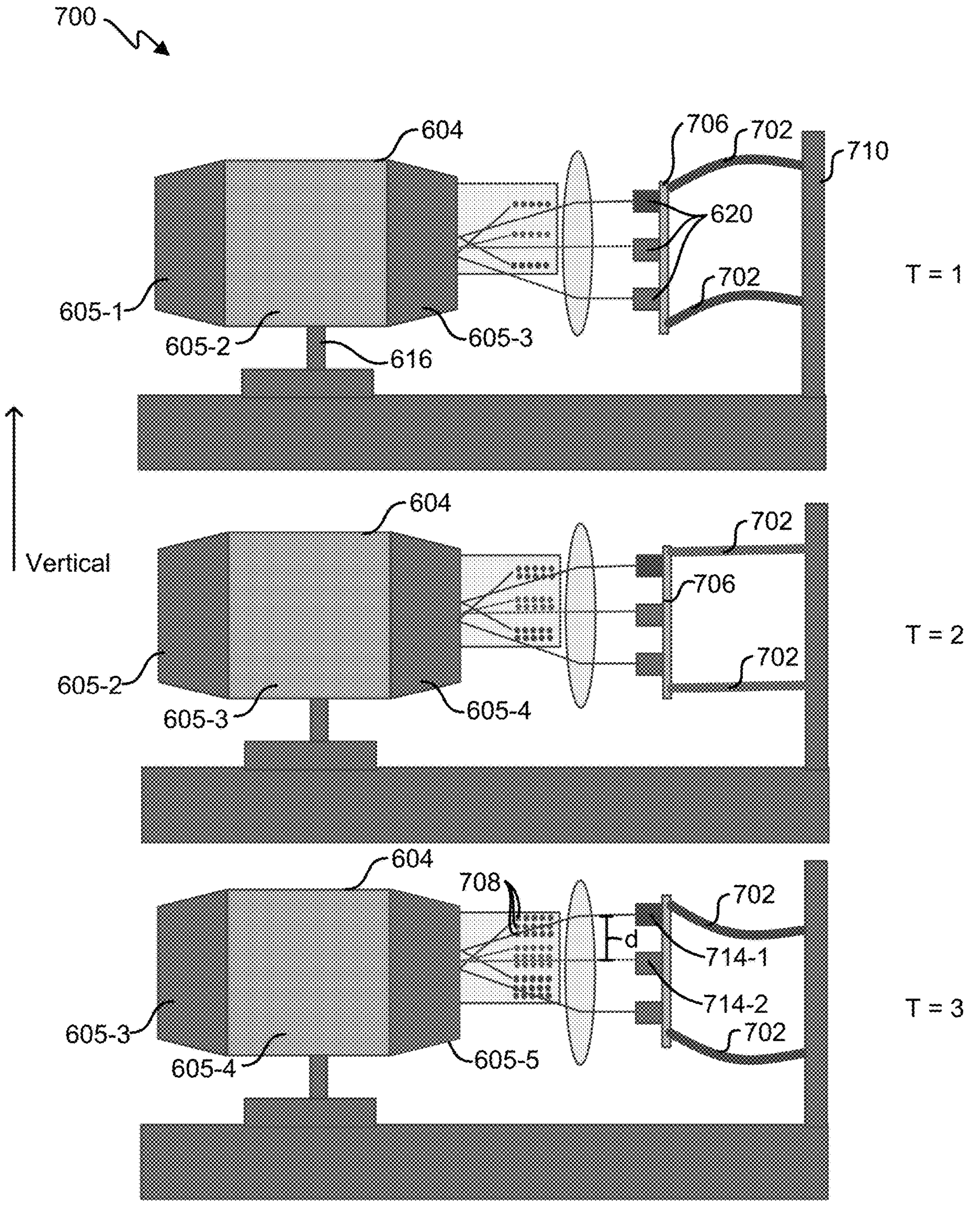
FIG. 7 depicts a time sequence of an embodiment of a LiDAR system showing scanning, using flexures, in a vertical direction.

FIG. 7 depicts a time sequence of an embodiment of a LiDAR system 700 showing scanning in a vertical direction using flexures 702. Scanning of the lasers 620 may be accomplished by mounting the lasers 620 on a board 706 (e.g., a platform), which is coupled (e.g., flexibly) with a base 710 (e.g., a fixed base) by flexures 702 that allow controllable movement of the lasers 620 in a vertical (and/or, in some configurations, horizontal) direction. The lasers 620 are fixedly coupled with the board 706 so that there is no relative movement between the lasers 620 and the board 706. A position of the lasers 620 (e.g., in relation to the mirror 604) may be scanned using a voice coil, linear motor, piezoelectric transducer, or other drive mechanism. In some implementations, the flexure 702 may be driven at a resonance frequency to reduce power constraints. The lasers 620, in some implementations, may be fiber coupled lasers, and/or one or more optical fibers are used to flexibly attach a laser output at the board 706 with one or more laser modules at the base 710.

As light from the lasers 620 passes over sides 605 of the mirror 604, lasers 620 will be in a different vertical positions, thus resulting in a denser arrangement of points in the vertical dimension. One or more detectors may be mounted on the board 706 (e.g., to scan synchronously with the lasers 620).

In the arrangement shown in FIG. 7, the mirror 604 rotates about a vertical axis 616 to reflect light from the illumination source (e.g., lasers 620) in a horizontal field of view. The illumination source (e.g., lasers 620 mounted on the board 706) is arranged to translate vertically to scan in a vertical dimension. It may also be advantageous, in some configurations, to scan the illumination source in a 2-dimensional manner to improve horizontal resolution as well as vertical resolution.

In FIG. 7, a simplified time sequence of T=1, T=2, and T=3 is shown. The mirror 604 comprises a first side 605-1, a second side 605-2, a third side 605-3, a fourth side 605-4, a fifth side 605-5, and a sixth side. At time T=1, the board 706 is at a lower vertical position (e.g., lower than a neutral vertical position) while light from lasers 620 is reflected by the fourth side 605-4 as the mirror 604 rotates. At time T=2, the board 706 is at a neutral vertical position while light from lasers 620 is reflected by the fifth side 605-5 as the mirror 604 rotates. At time T=3, the board 706 is at a higher vertical position (e.g., higher than neutral) while light from lasers 620 is reflected by the sixth side as the mirror 604 rotates.

In FIG. 7, lasers 620 can represent rows of lasers 620 (e.g., extending into and out of the page). In some configurations, vertical motion of the board 706 is equal to (e.g., +/−1, 5, 10, 15, or 20%), or no larger, than a distance between lasers 620, or rows of lasers 620, because scanlines 708 can be arranged to vertically fill the field of view as the illumination source translates vertically (e.g., as shown in FIG. 7 a time T=3). In some configurations, the illumination source comprises a plurality of lasers 620 arranged in a first row 714-1 and a second row 714-2; the illumination source is arranged to translate vertically to scan in the vertical dimension; and a distance of vertical movement (e.g., of the board 706) is equal to a distance d between a center of the first row and a center of the second row, plus or minus ten percent of the distance.

Figure 10:
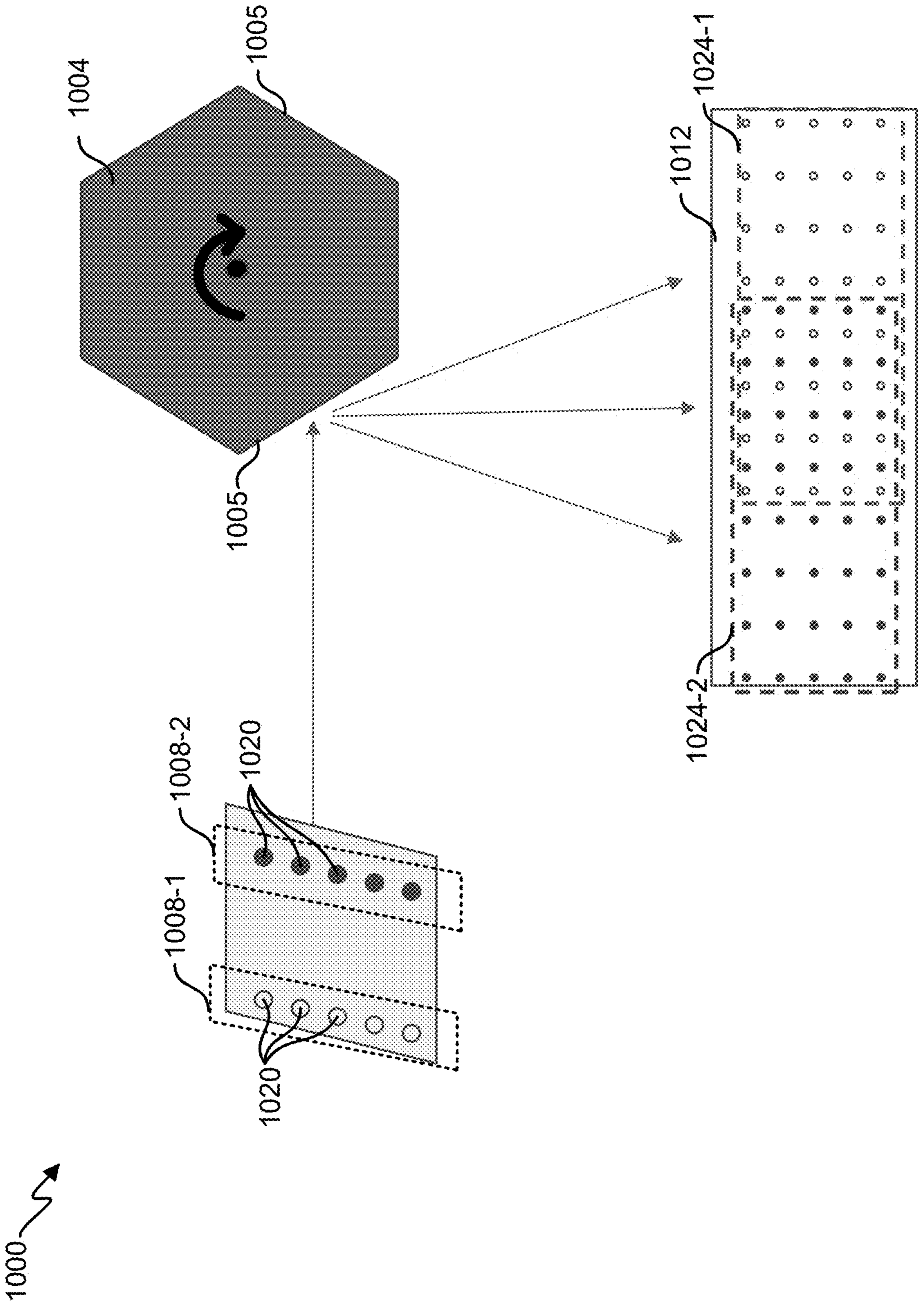
FIG. 10 depicts an embodiment of a LiDAR system with multiple illumination sources.
Figure 11:
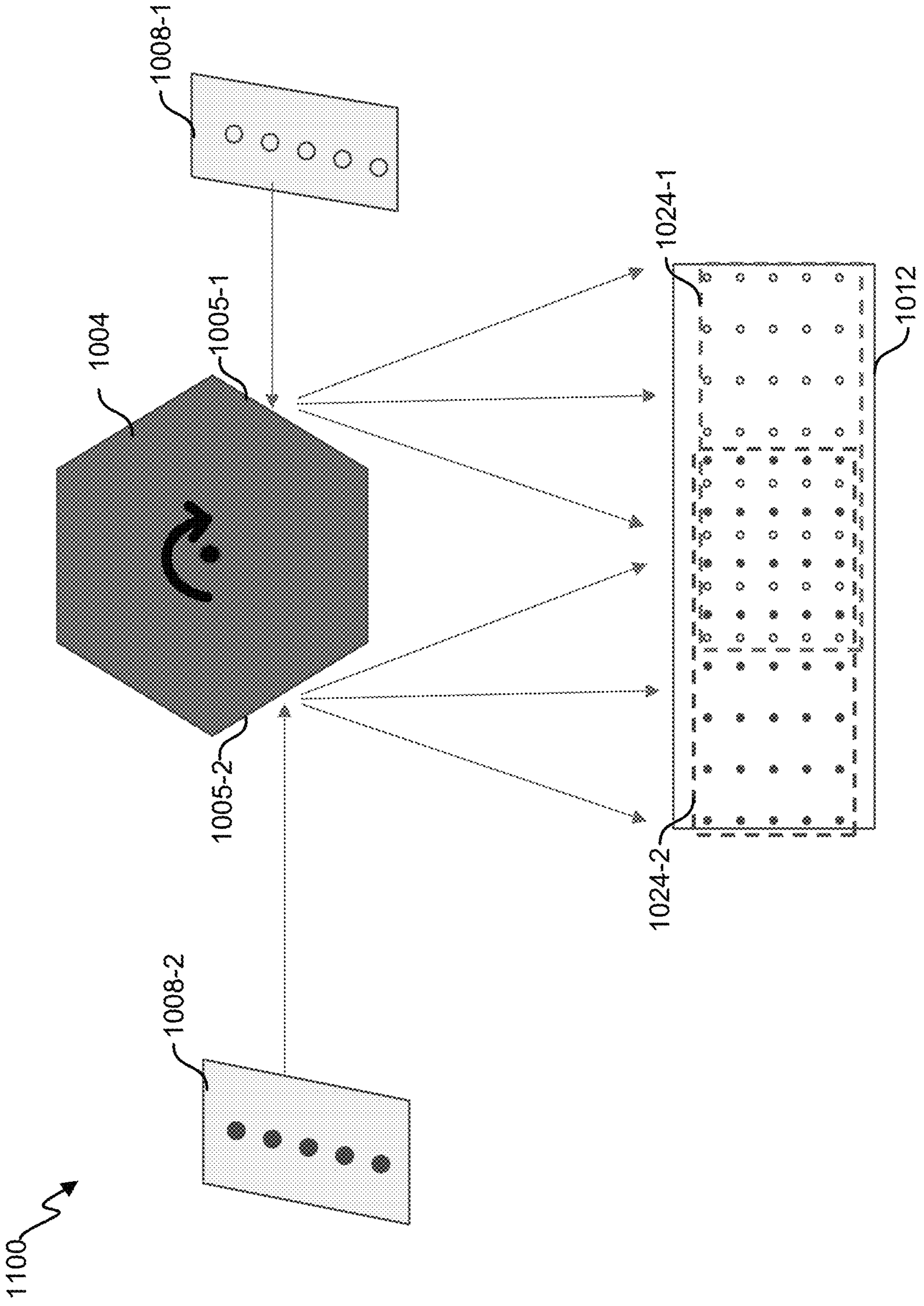
FIG. 11 depicts an embodiment of a LiDAR system with multiple illumination sources on opposite sides of a rotating mirror.

In some configurations, a second illumination source (e.g., on the platform 706 or on a second platform) is arranged to illumination the mirror 604 (e.g., similarly as described in conjunction with FIG. 10 and/or FIG. 11).

Figure 8:
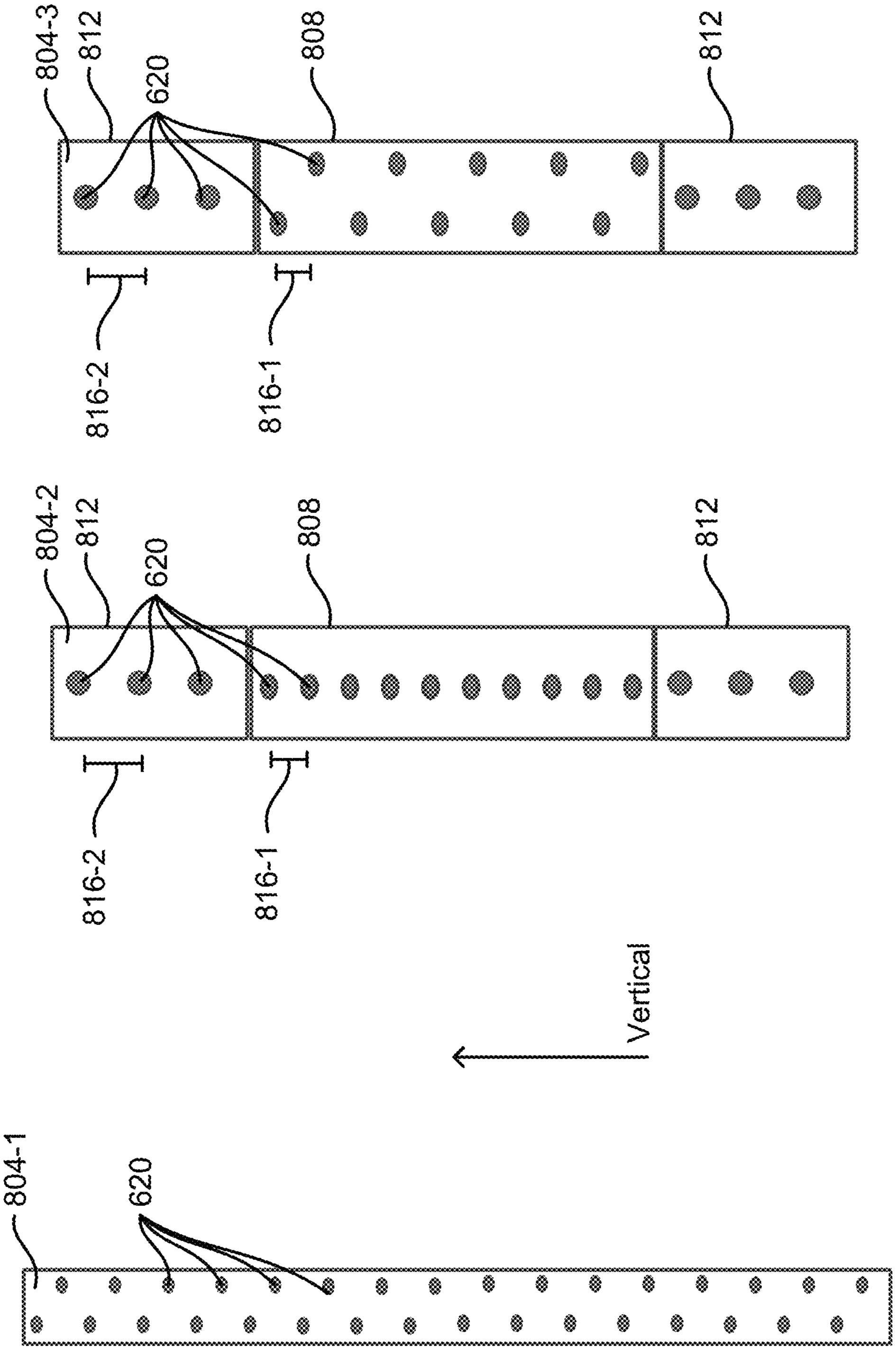
FIG. 8 depicts embodiments of illumination source arrangements.

FIG. 8 depicts embodiments of lasers 620 arranged in an illumination source 804. FIG. 8 depicts a first illumination source 804-1, a second illumination source 804-2, and a third illumination source 804-3. Though one or two columns are shown in the illumination source 804 in FIG. 8, the illumination source 804 can have more rows and/or columns.

The first illumination source 804-1 has lasers 620 arranged in two columns with constant pitch (e.g., spacing between lasers) in the vertical dimension.

The second illumination source 804-2 has lasers 620 arranged in the vertical direction with varying, or nonuniform, pitch (e.g., in one dimension). Pitch (e.g., in a vertical direction) is finer in a central portion 808 of the second illumination source 804-2 than in a periphery portion 812 of the second illumination source 804.2. This will result in more points and higher resolution in the central portion of the FOV compared to periphery portions (e.g., top and bottom) of the FOV.

In the third illumination source 804-3, lasers 620 are staggered in the central portion 808. Lasers 620 are staggered, for example, to allow for a larger number of lasers (and/or detectors) to be arranged in the vertical dimension (e.g., when a desired pitch of the laser array, and/or detector array, is less than a physical size of a laser 620 or detector).

In the second illumination source 804-2 and the third illumination source 804-3, a first plurality (or a first set) of lasers 620 (e.g., laser diodes) are arranged in a first region (e.g., in the central portion 808). A second plurality (or a second set) of lasers 620 are arranged in a second region (e.g., in the periphery portion 812). Lasers 620 in the first region are arranged with a first pitch 816-1. Lasers 620 in the second region are arranged with a second pitch 816-2. The first pitch 816-1 is smaller than the second pitch 816-2, so that the first plurality of lasers 620 are arranged in the first region in a higher density than the second plurality of lasers 620 in the second region.

Figure 9:
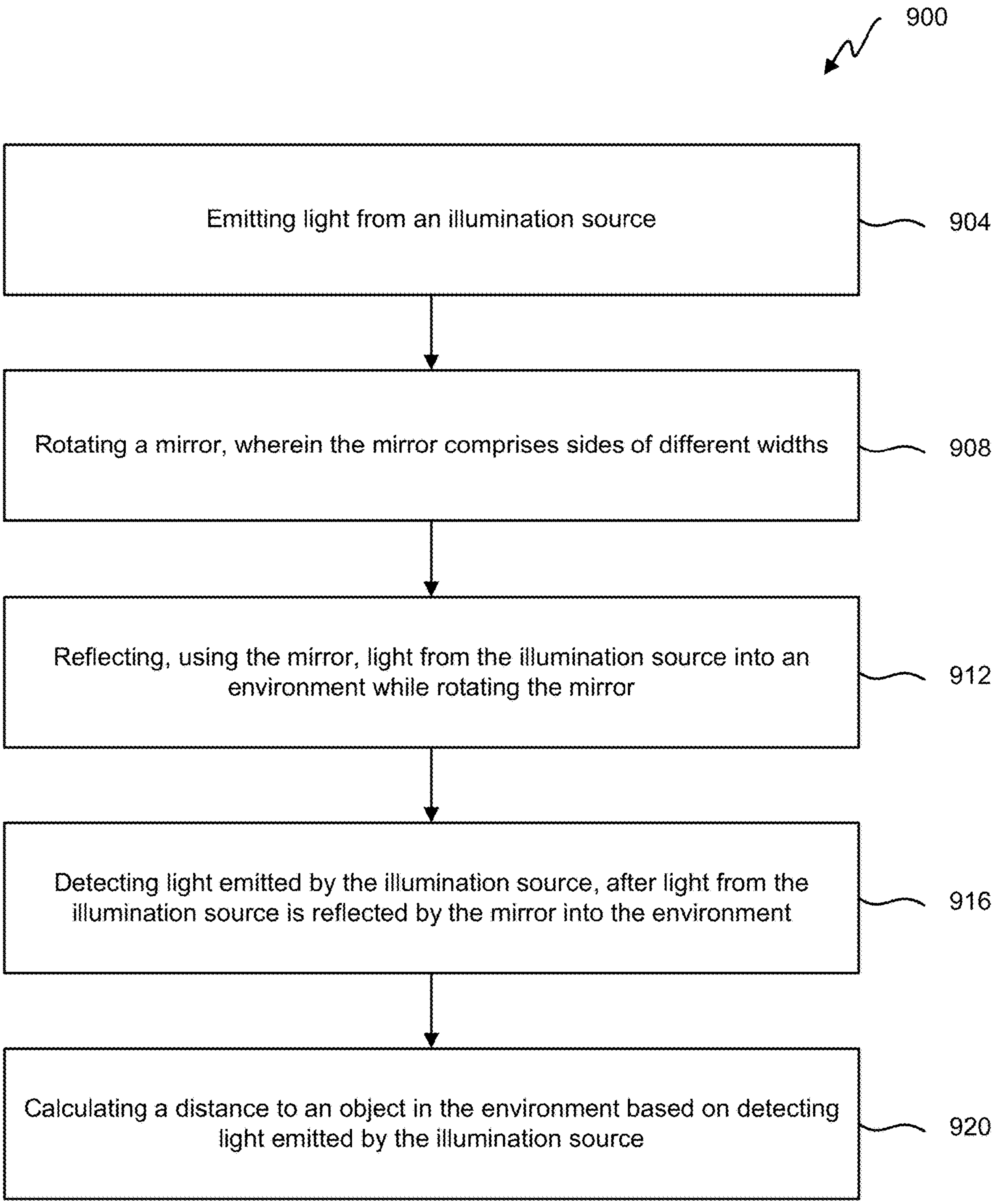
FIG. 9 illustrates a flowchart of an embodiment of a process for LiDAR scanning using a mirror with reflective surfaces of different widths.

FIG. 9 illustrates a flowchart of an embodiment of a process 900 for LiDAR scanning using a mirror with reflective surfaces of different widths. Process 900 begins in step 904 with emitting light from an illumination source. For example, light is emitted from illumination source 308 in FIG. 3. In step 908, a mirror is rotated (e.g., mirror 304 in FIG. 3). In step 912, light from the illumination source is reflected by the mirror into an environment (e.g., FOV 312, in FIG. 3) while the mirror rotates. The mirror comprises a first side and second side (e.g., first side 305-1 and second side 305-2). The first side has a first width. The second side has a second width. The second width is not equal to the first width.

In step 916, light emitted by the illumination source is detected, using a detector, after light from the illumination source is reflected by the mirror into the environment. In step 1920, a distance to an object in the environment is calculated based on the detector detecting the light emitted by the illumination source.

FIG. 10 depicts an embodiment of a LiDAR system 1000 having a rotating mirror 1004 and multiple illumination sources 1108. Light from the illumination sources 1008 is reflected by one or more sides 1005 of the mirror 1004 into a field of view (FOV) 1012 of the LiDAR system 1000.

A first illumination source 1008-1 comprises a first plurality of lasers 1020. A second illumination source 1008-2 comprises a second plurality of lasers 1020. The second illumination source 1008-2 emits light at the same wavelength as light from the first illumination source 1008-1. In some embodiments, the second illumination source 1008-2 emits light at a different wavelength than light from the first illumination source 1008-1. In some embodiments, an illumination source 1008 can have lasers or diodes that emit at different center wavelengths. Though a row of five lasers 1020 is shown for an illumination source 1008, an illumination source 1008 can have multiple columns and/or rows. For example, the illumination source can have one, two, three, or more columns of 1, 2, 3, 4, 5, 8, 16, or 32 lasers 1020.

The mirror 1004 is arranged to rotate and reflect light emitted from the first illumination source 1008-1 and the second illumination source 1008-2 into an environment. Light from the first illumination source 1008-1 is emitted into a first FOV 1024-1 of the first illumination source 1008-1. Light from the second illumination source 1008-2 is emitted into a second FOV 1024-2 of the second illumination source 1008-2. The first FOV 1024-1 at least partially overlaps the second FOV 1024-2. In FIG. 10, the first FOV 1024-1 partially overlaps the second FOV 1024-2 but does not fully overlap the second FOV 1024-2. In some configurations, the first FOV 1024-1 does not overlap the second FOV 1024-2 by more than ⅞, ¾, ⅝, ½, ⅓, or ¼ of the first FOV 1024-1 and/or at least overlaps the second FOV 1024-2 by at least ⅛, ¼, ⅓, or ½ of the first FOV 1024-1. For example, the second field of view overlaps at least ⅛ or ¼ of the first field of view and does not overlap more than ⅞ or ¾ of the first field of view; overlaps at least ⅛ of the first field of view and does not overlap more than ⅞ of the first field of view; overlaps at least ¼ of the first field of view and does not overlap more than ¾ of the first field of view; overlaps at least ¼ of the first field of view and does not overlap more than ⅞ of the first field of view; overlaps at least ⅛ of the first field of view and does not overlap more than ¾ of the first field of view; overlaps half the first field of view; or overlaps at least half the first field of view and not more than ⅝, ⅔, ¾, or ⅞ the first field of view. The FOV 1012 of the LiDAR system 1000 is a combination of the first FOV 1024-1 and the second FOV 1024-2 of the illumination sources 1008. The FOV 1012 of the LiDAR system 1000 has denser points in a center of the FOV 1012.

The second illumination source 1008-2 is separated from the first illumination source 1008-1. The second illumination source 1008-2 is separated from the first illumination source 1008-1 so that a field of view of the second illumination source 1008-2 does not fully overlap a field of view of the first illumination source 1008-1. In some configurations, overlap of the field of view of the first illumination source 1008-2 by the field of view of the second illumination source 1008-2 is equal to or less than ⅔, ½, ⅓, ¼, or ⅕. In some configurations, the field of view of the second illumination source 1008-2 does not overlap of the field of view of the first illumination source 1008-2.

A first detector and a second detector are arranged to receive light emitted by the first illumination source 1008-1 and the second illumination source 1008-2, after light emitted from the illumination source 1008 is reflected by the mirror 1004 into the environment. One or more memory devices comprise instructions that, when executed by one or more processors, calculates one or more distances to one or more objects in the environment based on the detector(s) receiving the light emitted from the illumination source 1008.

The first illumination source 1008-1 and the second illumination source 1008-2 are arranged so that light emitted from the first illumination source 1008-1 and the second illumination source 1008-2 concurrently illuminate the same side 1005 of the mirror 1004. Accordingly, the second illumination source 1008-2 is arranged to illuminate the side 1005 of the mirror while the first illumination source 1008-1 illuminates the same side 1005 of the mirror. In some configurations, the mirror 1004 has sides 1005 of equal width. In some configuration, sides 1005 of mirror 1004 are different widths (e.g., as shown in FIG. 3) and/or non-planar (e.g., as shown in FIG. 4).

As shown in FIG. 10, illumination sources 1008 are spread out horizontally. The first illumination source 1008-1 will scan a first side of the FOV 1012, and the second illumination source 1008-2 will scan a second side of the FOV 1012. Scanning may be arranged so that in a middle of the FOV 1012 has a 2× increase in density of points. Other arrangements of columns of lasers and/or laser spacing are possible. For example, more columns and/or rows of lasers may be used.

FIG. 11 depicts an embodiment of a LiDAR system 1100 with a rotating mirror 1004 and multiple illumination sources 1008 on opposite sides of the rotating mirror 1004. The mirror 1004 comprises a first side 1005-1 and a second side 1005-2. The mirror 1004 is arranged to reflect light emitted from the first illumination source 1008-1 into an environment using the first side 1005-1 of the mirror and reflect light emitted from the second illumination source 1008-2 into the environment using the second side 1005-2 of the mirror 1004 while the first side 1005-1 of the mirror 1004 is used to reflect light from the first illumination source 1008-1. A first detector is arranged to receive light emitted from the first illumination source 1008-1, after light emitted from the first illumination source 1008-1 is reflected by the mirror 1004 into the environment. A second detector is arranged to receive light emitted from the second illumination source 1008-2, after light emitted from the second illumination source 1008-2 is reflected by the mirror 1004 into the environment.

In FIG. 11, the second illumination source 1008-2 is arranged opposite the first illumination source 1008-1 (e.g., with respect to the mirror 1004). This allows a single polygon mirror to scan multiple illumination sources 1008 (e.g., multiple sets of lasers). An overlap between light from illumination sources 1008 in the FOV 1012 can be adjusted by varying positions of the illumination sources 1008 relative to the mirror 1004. Thus, an ROI may also be varied.

In some configurations, a detector for the first illumination source 1008-1 is arranged on the opposite side of the first illumination source 1008-1 (e.g., adjacent to the second illumination source 1008-2). In some configurations, the second illumination source is not used and the detector for the first illumination source 1008-1 is on the opposite side of the mirror 1004. This can avoid the use of a beam splitter to separate outgoing laser beams from return beams.

Though fields of view 1024 are shown overlapping in FIG. 11, in some configurations fields of view 1024 do not overlap but are used to create a wider FOV 1012.

Figure 12:
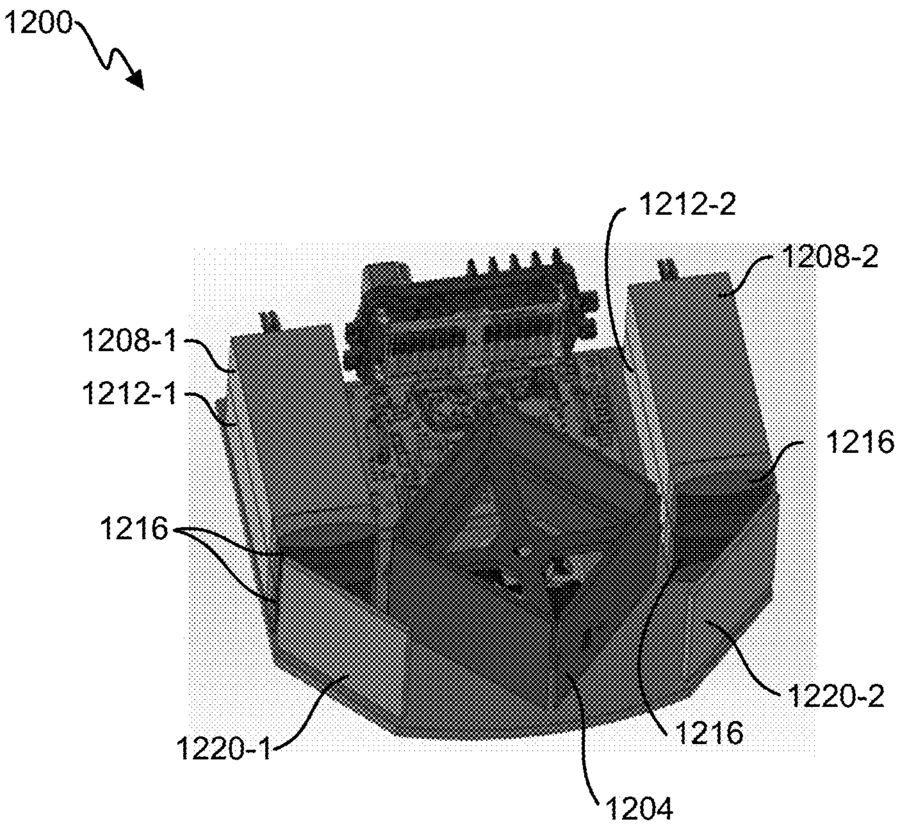
FIG. 12 depicts another embodiment of a LiDAR system with multiple illumination sources on opposite sides of a rotating mirror.

FIG. 12 depicts another embodiment of a LiDAR system 1200 with a mirror 1204 arranged to rotate and multiple illumination sources 1208 on opposite sides of the mirror 1204. The LiDAR system 1200 comprises the mirror 1204, a first illumination source 1208-1, a second illumination source 1208-2, a first detector 1212-1, and a second detector 1212-2. The LiDAR system 1200 comprises lenses 1216 and directing mirrors 1220.

The first illumination source 1208-1 comprises a first plurality of lasers contained within a first housing. The second illumination source 1208-2 comprises a second plurality of lasers contained within a second housing. The first detector 1212-1 comprises a first plurality of sensors (e.g., diodes) arranged in a third housing (though in some embodiments, sensors of the first detector 1212-1 are housed in the first housing or the second housing). The second detector 1212-2 comprises a second plurality of sensors (e.g., diodes) arranged in a fourth housing (though in some embodiments, sensors of the second detector 1212-2 are housed in the second housing or the first housing). In some arrangements, a number of sensors in the detector 1212 matches a number of lasers in the illumination source 1208.

The first detector 1212-1 is arranged to detect light from the first illumination source 1208-1, and the second detector 1212-2 is arranged to detect light from the second illumination source 1208-2, after light from illumination sources 1208 is transmitted into an environment. In some embodiments, the first detector 1212-1 is arranged to detect light from the second illumination source 1208-2, and the second detector 1212-2 is arranged to detect light from the first illumination source 1208-1 (e.g., as discussed in conjunction with FIG. 11).

Light from the illumination source 1208 is reflected by directing mirror 1220 to mirror 1204 (e.g., for a transmit path), and from mirror 1204 to detector 1212 (e.g., for a return path). Lenses 1216 are collimating lenses. One or more distances to one or more objects in the environment are measured using the illumination sources 1208 and detectors 1212. For example, a first distance to a first object in the environment is measured using the first illumination source 1208-1 and the first detector 1212-1; and a second distance to the first object, or to a second object, is measured using the second illumination source 1208-2 and the second detector 1212-2. Light from the first illumination source 1208-1, travels along a first optical path to the mirror 1204, and light from the second illumination source 1208-2 travels along a second optical path to the mirror 1204, where the second optical path is a different horizontal direction than the first optical path. For example, a first directing mirror 1220-1 directs light from the first illumination source 1208-1 in a positive x direction toward the mirror 1204, and a second directing mirror 1220-2 directs light from the second illumination source 1208-2 in a negative x direction toward the mirror 1204.

The second illumination source 1208-2 is separated from the first illumination source by a distance equal to or greater than 0.5, 0.75, 1, 1.5, or 1.7 times a width of the mirror 1204, and/or equal to or less than 3, 2, or 1.7 times the width of the mirror.

Though the illumination sources 1208 are shown on top of detectors 1212, they could be arranged side-by-side, or the illumination sources 1208 could be underneath detectors 1212.

Figure 13:
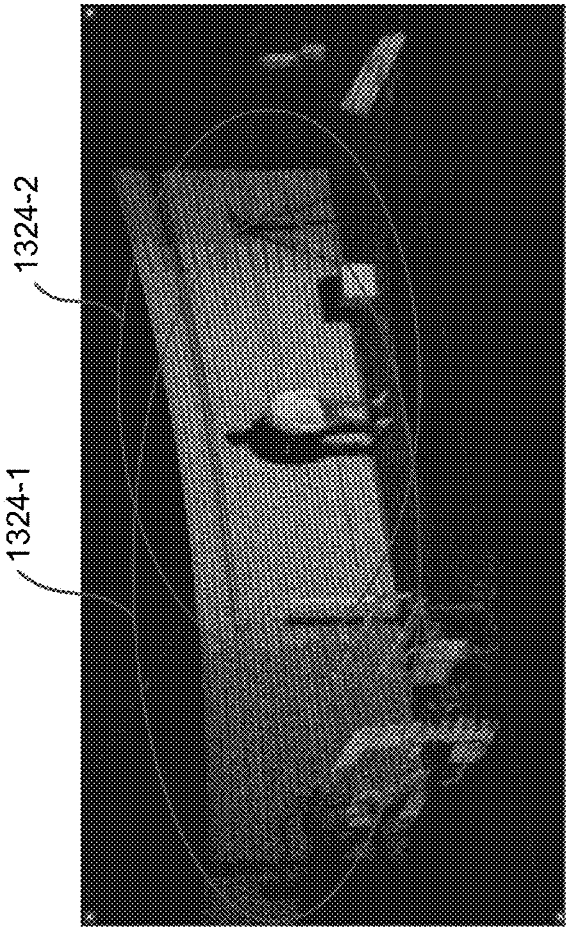
FIG. 13 depicts overlapping fields of view of an embodiment of a LiDAR system with multiple illumination sources.

FIG. 13 depicts an image of overlapping fields of view of an embodiment of a LiDAR system with two illumination sources. A first field of view 1324-1 from a first illumination source overlaps with a second field of view 1324-2 from a second illumination source. A region of overlap has a higher density of measurement points than sides of field of view 1324 that do not overlap.

Figure 14:
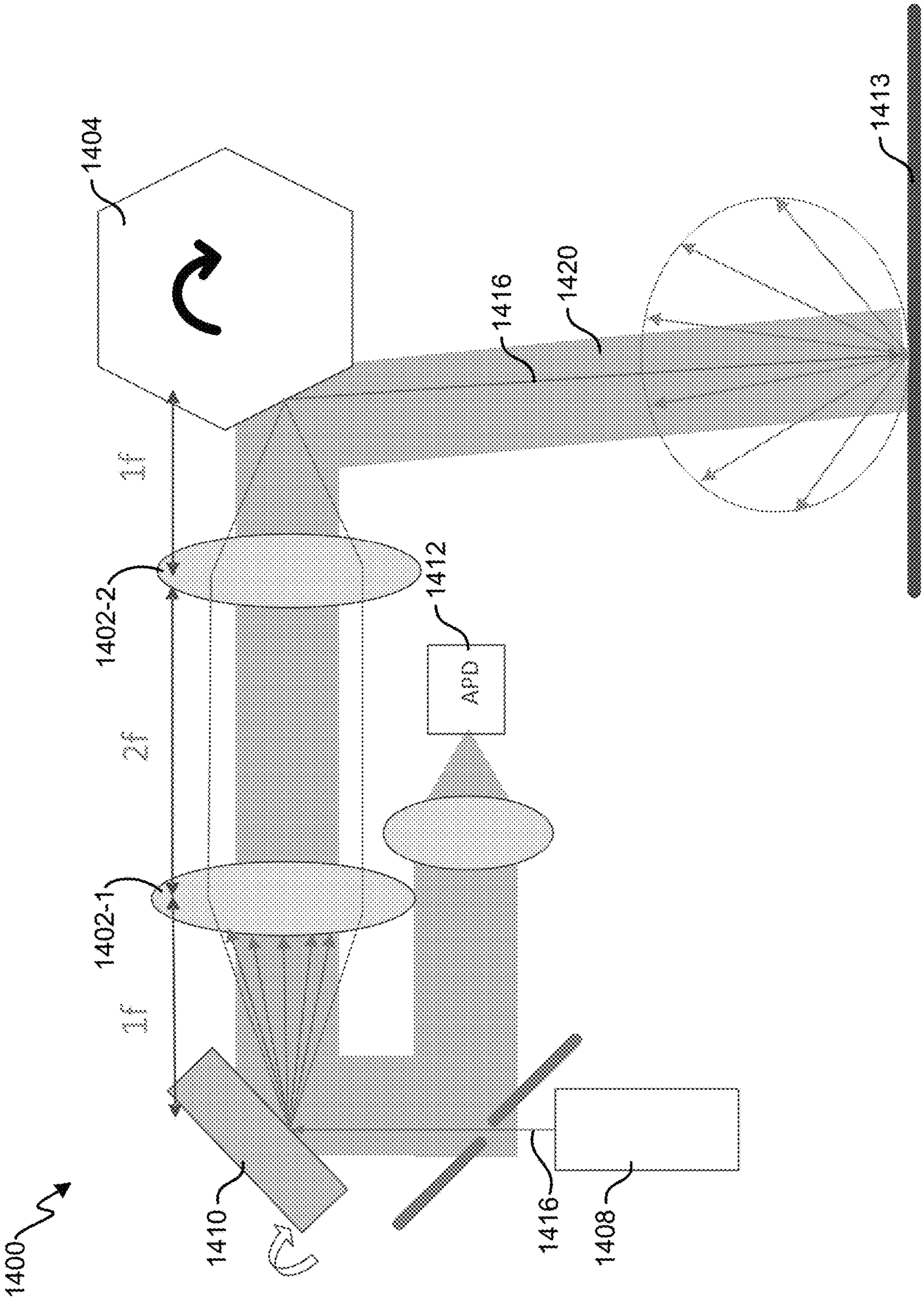
FIG. 14 depicts an embodiment of a LiDAR system with a compound lens.

FIG. 14 depicts an embodiment of a LiDAR system 1400 with a compound lens. Compound lens comprises a first lens 1402-1 and a second lens 1402-2. The compound lens is inserted between a mirror 1404 (e.g., a rotating polygonal mirror) and an illumination source 1408 (e.g., one or more lasers and a GRIN lens). The lens 1402 has a focal length off. The first lens 1402-1 is separated from the second lens 1402-2 by a length of 2f. The compound lens can be used as an optical relay that can correlate a light beam at an input and an output. The input (e.g., at a galvo mirror 1410) is if from the first lens 1402-1 and the output (e.g., at the mirror 1404) is if from the second lens 1402-2.

A detector 1412 (e.g., an avalanche photodiode), receives light reflected from an object 1413. A transmit path 1416 and a receive path 1420 are shown.

While the arrangement in FIG. 14 shows a 4f two lens element optic, other optical relay arrangements may be used that change an angle of illumination at the mirror 1404 without substantially changing its position, as an angle with illumination of the mirror 1404 is changed.

One possible advantage of this design in a galvo/polygon system is that an output location will not change as the galvo mirror 1410 is scanned. Accordingly, an aperture size constraint of the system can be reduced or minimized.

In some configurations, a system comprises a first lens (e.g., first lens 1402-1) and a second lens (e.g., second lens 1402-2). The first lens is characterized by a first focal length (e.g., f). The second lens is characterized by a second focal length (e.g., for g, where g is not equal to f). The first lens is positioned a first distance from a mirror (e.g., galvo mirror 1410; or mirror 1404). The first distance is equal to the first focal length. The second lens is positioned a second distance from the first lens. The second distance is equal to the sum of the first focal distance and the second focal distance (e.g., 2f, if the first focal distance is equal to the second focal distance, or f+g).

Figure 15:
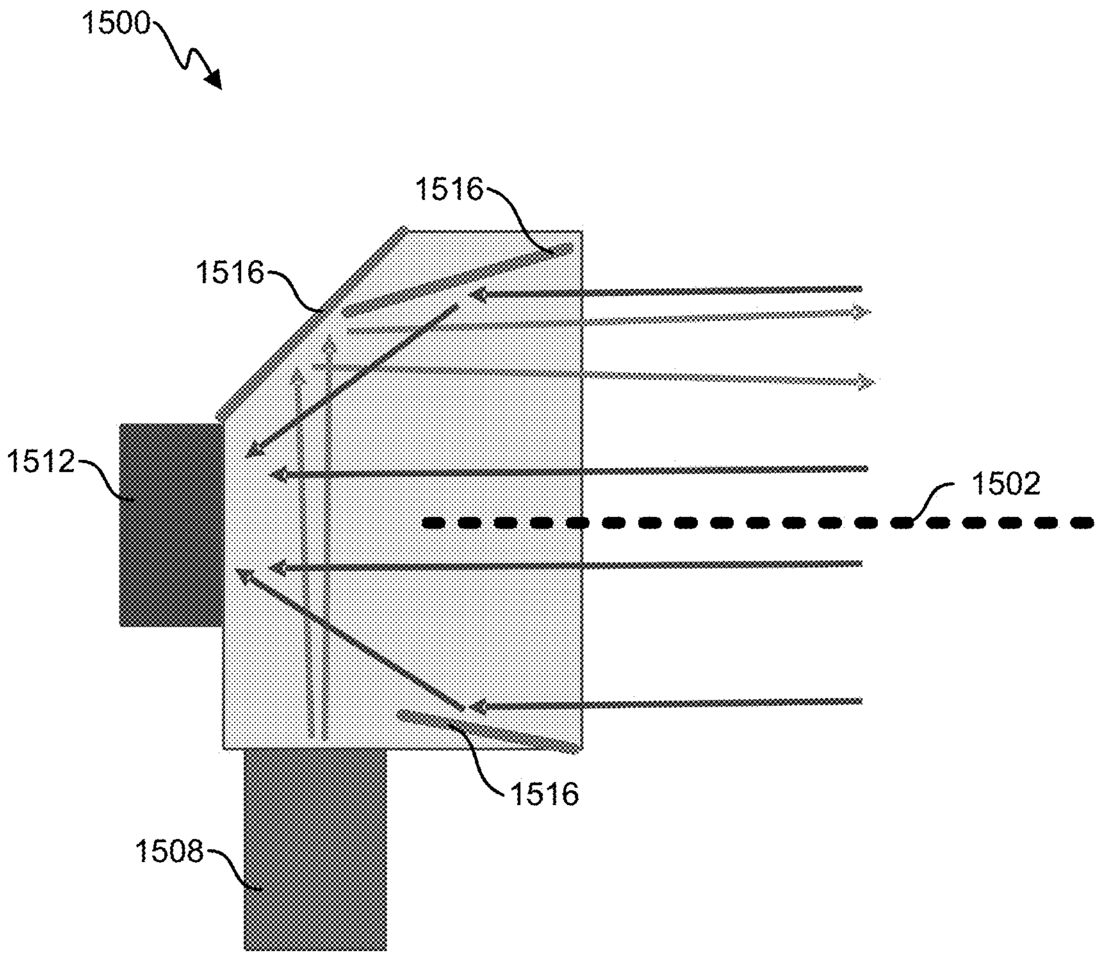
FIG. 15 depicts an embodiment of an integrated optics assembly for LiDAR.

FIG. 15 depicts an embodiment of an integrated optics assembly 1500 for LiDAR. The integrated optics assembly has a coaxial design. FIG. 15 shows an optical path, a coaxial path 1502, of light emitted by an illumination source 1508 and light returning to a detector 1512. Returning photons travel basically the same path as light from a laser beam, but in a reverse direction. A type of beam-splitting optics is used to separate the outgoing beam from the returning photons.

Figure 16:
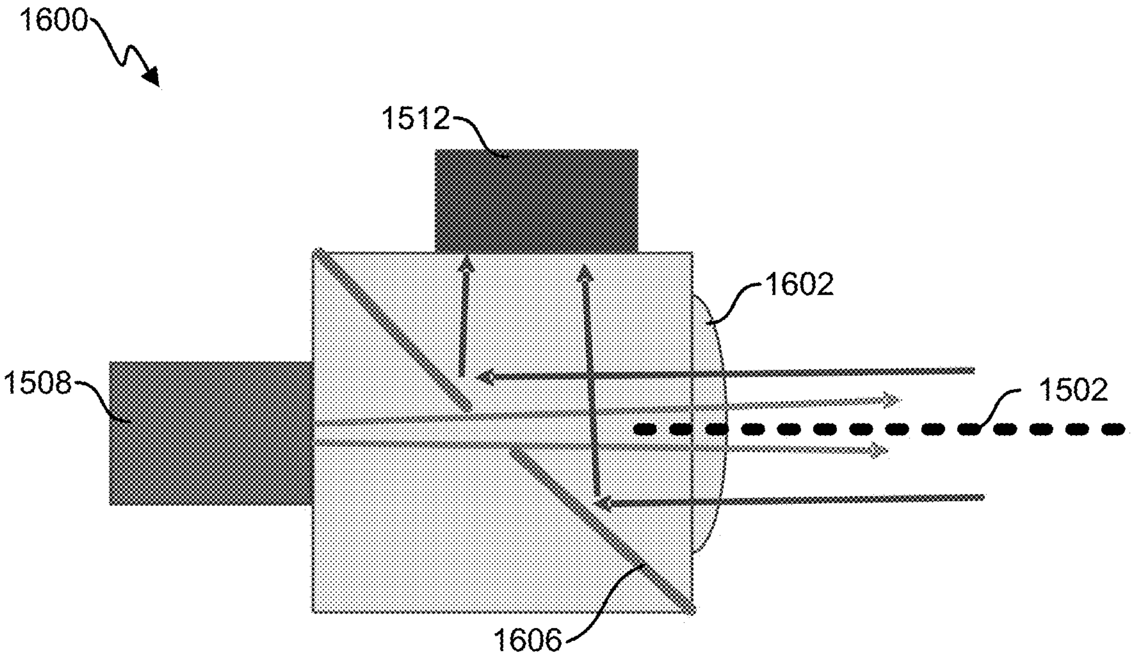
FIG. 16 depicts an embodiment of an integrated optics with a lens used for LiDAR.

FIG. 15 and FIG. 16 show a couple examples of an integrated optic assembly that can be used to implement a beam-splitting function. By integrating optical components into a single miniature subassembly, a size and/or cost can be reduced.

In FIG. 15, mirrors 1516 are arranged to direct light from the illumination source 1508 to the coaxial path 1502, and/or to direct returning photons to the detector 1512. Mirrors 1516 are segments in a conical arrangement. In some embodiments, the mirror 1516 is a conical mirror. The detector 1512 is orthogonal to the illumination source 508. In some configurations, a prism (e.g., using total internal reflection) is positioned instead of a mirror 1516 that is farthest away from the illumination source 1508. The FIG. 16 depicts an embodiment of an integrated optic 1600 with a lens 1602 and a beam splitter 1606. The lens 1602 can be convex (e.g., to collimate light and/or to focus light onto a detector) or concave (e.g., to help shape divergence of a laser beam into a more symmetrical distribution). The beam splitter 1606 is a mirrored beam splitter. The lens is a mini-lens (e.g., a width, or diameter, equal to or greater than 0.5, 1, or 2 mm and/or equal to or less than 2, 3, 5, or 10 mm). Light from the illumination source 1508 passes through the lens 1602 to the rotating mirror (e.g., mirror 304 in FIG. 3), and light passes from the rotating mirror through the lens 1602 to the detector 1512. In some arrangements, the lens 1602 is used to collimate light from the laser and/or focus light onto the detector 1512.

Components of the integrated optics assembly 1500 and/or the integrated optic 1600 can include mirror(s), beam-splitter(s), miniature lens(es), and/or diffractive optical element(s). In some configurations, the entire size of the integrated optics assembly 1500 in FIG. 15 or the integrated optic 1600 in FIG. 16 is in the range of 1 to 3 mm on each side.

The integrated optics assembly 1500 and the integrated optic 1600 are examples of beam splitters positioned optically between an illumination source and a rotating mirror and between a detector and the rotating mirror so that there light from the illumination source and light returning to the detector share an optical path (e.g., a coaxial path) between the beam splitter than the rotating mirror.

Figure 17:
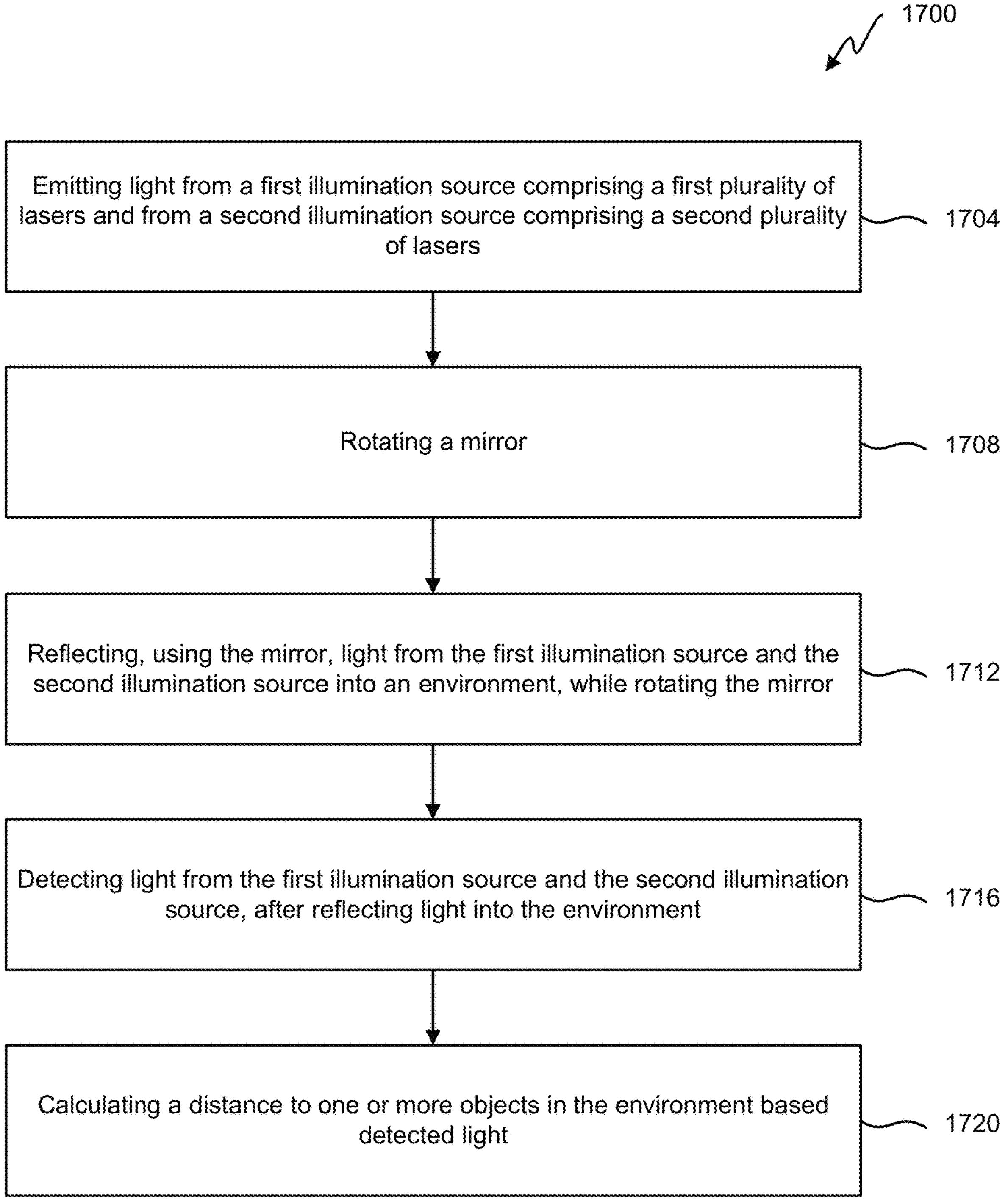
FIG. 17 illustrates a flowchart of an embodiment of a process for LiDAR using multiple illumination sources.

FIG. 17 illustrates a flowchart of an embodiment of a process 1700 for LiDAR using multiple illumination sources. Process 1700 begins in step 1704 with emitting light from a first illumination source and a second illumination source. The first illumination source comprises a first plurality of lasers. The second illumination source comprises a second plurality of lasers. For example, the first illumination source is the first illumination source 1008-1 in FIG. 10 or 11, and the second illumination source is the second illumination source 1008-2 in FIG. 10 or 11.

In step 1708, a mirror is rotated. For example, mirror 1004 in FIG. 10 or 11 is rotated.

In step 1712, light from the first illumination source and the second illumination source is reflected into an environment, while rotating the mirror. For example, light is reflected by mirror 1004 into a field of view 1012 in FIG. 10 or 11.

After light is reflected into an environment, light is detected, step 1716. For example, light is detected using the first detector 1212-1 and the second detector 1212-2 in FIG. 12. Distances to one or more objects in the environment are calculated based on detecting received light from the environment.

Figure 18:
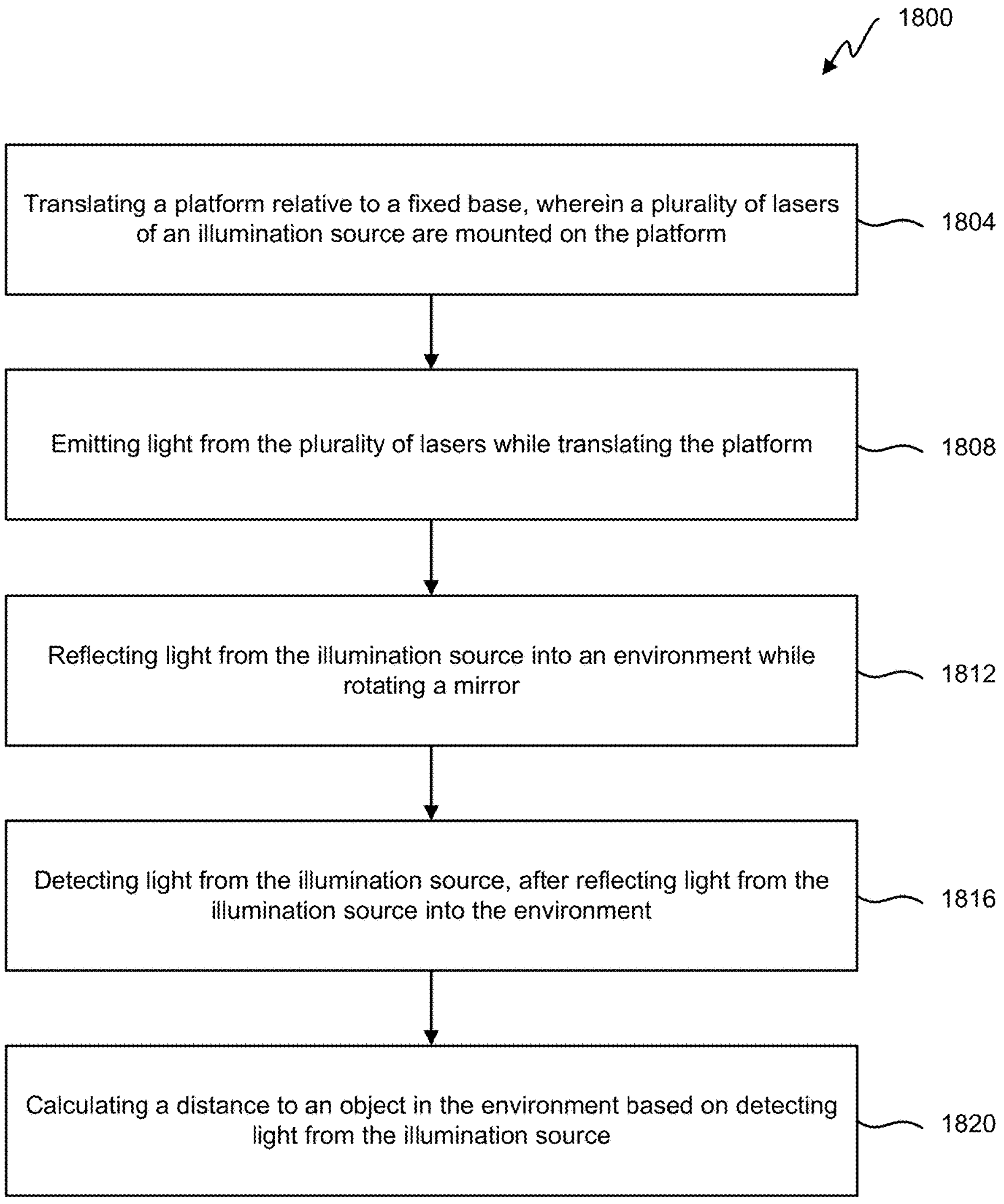
FIG. 18 illustrates a flowchart of an embodiment of a process 1800 for LiDAR using a translating platform and a rotating mirror.

FIG. 18 illustrates a flowchart of an embodiment of a process 1800 for LiDAR using a translating platform and a rotating mirror. Process 1800 begins in step 1804 with translating a platform relative to a fixed base, wherein a plurality of lasers of an illumination source are mounted on the platform (e.g., board 706 in FIG. 7 is translated relative to base 710). In step 1808, light from the plurality of lasers is emitted while translating the platform mirror is rotated.

In step 1812, light from the illumination source is reflected into an environment, while rotating a mirror. For example, light form lasers 620 is reflected by mirror 604 as mirror 604 rotates in FIG. 7.

After light is reflected into an environment, light is detected, step 1816. Distances to one or more objects in the environment are calculated based on detecting received light from the illumination source after light from the illumination source is reflected into the environment.

In some configurations, the platform is translated in a vertical dimension, and the mirror rotates horizontally about a vertical axis (e.g., as shown in FIG. 7). In some arrangements the platform is translated in only one dimension (e.g., the vertical dimension; to simplify computation). In some configurations, the platform is translated in two dimensions.

Various features described herein, e.g., methods, apparatus, computer-readable media and the like, can be realized using a combination of dedicated components, programmable processors, and/or other programmable devices. Some processes described herein can be implemented on the same processor or different processors. Where some components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Details are given in the above description to provide an understanding of the embodiments. However, it is understood that the embodiments may be practiced without some of the specific details. Examples in different figures may be combined in various ways to enhance performance or modified for a specific application. For example, vertical motion of sources in FIG. 7 may be combined with variable laser spacing in FIG. 8, or the mirror 405 in FIG. 4 can be used for the mirror 1004 in FIG. 10. In some instances, well-known circuits, processes, algorithms, structures, and techniques are not shown in the figures.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system for LiDAR using a rotating mirror with reflective surfaces of different widths, the system comprising:

an illumination source; and a mirror, wherein:

the mirror is arranged to rotate;

the mirror comprises a first side and second side;

the first side has a first width;

the second side has a second width;

the second width is not equal to the first width;

the first side and the second side of the mirror are arranged to reflect light from the illumination source into an environment as the mirror rotates;

the mirror rotates about a vertical axis to reflect light from the illumination source horizontally into a field of view; and the first side of the mirror rotates vertically to reflect light from the illumination source vertically into the field of view.

2. A system for LiDAR using a rotating mirror with reflective surfaces of different widths, the system comprising:

an illumination source, wherein:

the illumination source comprises:

a first plurality of laser diodes arranged in a first region; and a second plurality of laser diodes arranged in a second region; and the first plurality of laser diodes are arranged in the first region in a higher density than the second plurality of laser diodes are arranged in the second region; and a mirror, wherein:

the mirror is arranged to rotate;

the mirror comprises a first side and second side;

the first side has a first width;

the second side has a second width;

the second width is not equal to the first width; and the first side and the second side of the mirror are arranged to reflect light from the illumination source into an environment as the mirror rotates.

3. The system of claim 2, wherein:

the system comprises:

a detector arranged to receive light emitted by the illumination source, after light from the illumination source is reflected by the mirror into the environment; and one or more memory devices comprising instructions that, when executed by one or more processors, performs a step for calculating a distance to an object in the environment based on the detector receiving the light emitted by the illumination source; and the mirror rotates about a vertical axis to reflect light from the illumination source into a horizontal field of view.

4. The system of claim 2, wherein the first width is greater than the second width and equal to or less than four times the second width.

5. The system of claim 2, wherein the mirror comprises three sides.

6. The system of claim 2, wherein the first side and the second side have a reflectance, at a wavelength of the illumination source, equal to or greater than 90%.

7. The system of claim 2, wherein the illumination source is a laser array comprising a plurality of lasers.

8. The system of claim 2, wherein:

the mirror rotates about a vertical axis to reflect light from the illumination source in a horizontal field of view; and the illumination source is arranged to translate vertically to scan in a vertical dimension.

9. The system of claim 2, wherein:

the illumination source comprises a plurality of lasers arranged in a first row and a second row;

the illumination source is arranged to translate vertically to scan in a vertical dimension; and a distance of vertical movement is equal to a distance between a center of the first row and a center of the second row, plus or minus ten percent of the distance.

10. The system of claim 2, further comprising a first lens and a second lens, wherein:

the first lens is characterized by a first focal length;

the second lens is characterized by a second focal length;

the first lens is positioned a first distance from the mirror;

the first distance is equal to the first focal length;

the second lens is positioned a second distance from the first lens; and the second distance is equal to a sum of the first focal length and the second focal length.

11. The system of claim 2, comprising a lens, wherein:

light from the illumination source passes through the lens to the mirror; and light passes from the mirror through the lens to a detector.

12. The system of claim 2, wherein:

illumination source is a first illumination source;

the system comprises a second illumination source;

the mirror comprises a third side; and the second illumination source is arranged opposite the first illumination source so that the first illumination source illuminates the first side of the mirror while the second illumination source illuminates the third side of the mirror.

13. The system of claim 2, further comprising a beam splitter between the illumination source and the mirror.

14. A method for LiDAR the method comprising:

emitting light from an illumination source, wherein:

the illumination source comprises:

a first plurality of laser diodes arranged in a first region; and a second plurality of laser diodes arranged in a second region; and the first plurality of laser diodes are arranged in the first region in a higher density than the second plurality of laser diodes are arranged in the second region;

rotating a mirror;

reflecting, using the mirror, light from the illumination source into an environment, while rotating the mirror, wherein:

the mirror comprises a first side and second side;

the first side has a first width;

the second side has a second width; and the second width is not equal to the first width;

detecting, using a detector, light emitted by the illumination source, after light from the illumination source is reflected by the mirror into the environment; and calculating a distance to an object in the environment based on the detector detecting the light emitted by the illumination source.

15. The method of claim 14, wherein the first width is greater than the second width and equal to or less than four times the second width.

16. The method of claim 14, comprising:

rotating the mirror about a vertical axis to reflect light from the illumination source in a horizontal field of view; and translating the illumination source vertically to vertically displace light from the illumination source in a vertical field of view.

17. The method of claim 14, comprising:

passing light from the illumination source through a lens to the mirror; and passing light from the mirror through the lens to the detector.

* * * * *